US012629741B2

(12) United States Patent (10) Patent No.: US 12,629,741 B2
Sato et al. (45) Date of Patent: May 19, 2026

(54) STEEL SHEET FOR HOT PRESS FORMING, METHOD OF PRODUCING STEEL SHEET FOR HOT PRESS FORMING, AND METHOD OF PRODUCING HOT PRESSED MEMBER

(71) Applicant: JFE STEEL CORPORATION, Tokyo (JP)

(72) Inventors: Rinta Sato, Tokyo (JP); Kazuhiko Yamazaki, Tokyo (JP); Yoichi Makimizu, Tokyo (JP); Minoru Tanaka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/726,221

(22) PCT Filed: Nov. 17, 2022

(86) PCT No.: PCT/JP2022/042769
§ 371 (c)(1),
(2) Date: Jul. 2, 2024

(87) PCT Pub. No.: WO2023/135932
PCT Pub. Date: Jul. 20, 2023

(65) Prior Publication Data
US 2025/0108422 A1 Apr. 3, 2025

(30) Foreign Application Priority Data
Jan. 11, 2022 (JP) ................................. 2022-002599

(51) Int. Cl.
| | |
|---|---|
| B21D 22/02 | (2006.01) |
| B21D 22/20 | (2006.01) |
| B32B 15/01 | (2006.01) |
| B32B 15/04 | (2006.01) |
| B32B 15/18 | (2006.01) |
| B32B 15/20 | (2006.01) |
(Continued)

(52) U.S. Cl.
CPC ......... *B21D 22/022* (2013.01); *B21D 22/208* (2013.01); *B32B 15/012* (2013.01); *B32B 15/04* (2013.01); *B32B 15/043* (2013.01); *B32B 15/18* (2013.01); *B32B 15/20* (2013.01); *C21D 1/18* (2013.01); *C21D 8/0263* (2013.01); *C21D 9/00* (2013.01); *C21D 9/46* (2013.01); *C21D 9/48* (2013.01); *C22C 21/02* (2013.01); *C22C 21/04* (2013.01); *C22C 38/00* (2013.01); *C22C 38/02* (2013.01); *C22C 38/04* (2013.01); *C22C 38/60* (2013.01); *C23C 2/12* (2013.01); *C23C 2/26* (2013.01); *C23C 2/28* (2013.01); *C23C 2/29* (2022.08); *C23C 2/40* (2013.01); *C23C 28/321* (2013.01); *C23C 28/322* (2013.01); *C23C 28/345* (2013.01); *C23C 30/00* (2013.01); *C23C 30/005* (2013.01); *Y10T 428/12757* (2015.01); *Y10T 428/12972* (2015.01); *Y10T 428/2495* (2015.01); *Y10T 428/24967* (2015.01); *Y10T 428/24975* (2015.01); *Y10T 428/264* (2015.01); *Y10T 428/265* (2015.01)

(58) Field of Classification Search
CPC ...... B21D 22/022; B21D 22/208; C21D 1/18; C21D 8/0263; C21D 9/00; C21D 9/46; C21D 9/48; C22C 21/02; C22C 21/04; C22C 38/00; C22C 38/02; C22C 38/04; C22C 38/60; C23C 2/12; C23C 2/26; C23C 2/28; C23C 2/29; C23C 2/40; C23C 28/321; C23C 28/322; C23C 28/345; C23C 30/00; C23C 30/005; B32B 15/012; B32B 15/04; B32B 15/043; B32B 15/18; B32B 15/20; Y10T 428/12757; Y10T 428/12972; Y10T 428/264; Y10T 428/265; Y10T 428/2495; Y10T 428/24967; Y10T 428/24975
See application file for complete search history.

(56) References Cited

U.S. PATENT DOCUMENTS

| | | |
|---|---|---|
| 2017/0260601 A1 | 9/2017 | Banik et al. |
| 2020/0189233 A1 | 6/2020 | Suzuki et al. |
(Continued)

FOREIGN PATENT DOCUMENTS

| | | |
|---|---|---|
| EP | 3889310 A1 | 10/2021 |
| EP | 3889313 A1 | 10/2021 |
(Continued)

OTHER PUBLICATIONS

Machine Translation, Maki et al., JP 2004-238682, Aug. 26, 2004. (Year: 2004).*
(Continued)

*Primary Examiner* — Michael E. La Villa
(74) *Attorney, Agent, or Firm* — KENJA IP LAW PC

(57) ABSTRACT

A steel sheet for hot press forming that can reduce diffusible hydrogen content introduced in hot press forming without controlling the atmosphere dew point, and may be used to obtain a hot pressed member that has excellent post-coating corrosion resistance. The steel sheet includes a base steel sheet and a coated layer on both sides of the base steel sheet. The coated layer has a chemical composition containing Si: 7 mass % to 11 mass %, Mg: 0.6 mass % to 1.9 mass %, one or both of Ca and Sr: in total, 1.0% to 10% of Mg, and Fe: 0 mass % to 30 mass %, with the balance being Al and inevitable impurity. Concentration of Mg solute in Al phase in the coated layer is less than 1 mass %, and average thickness of the coated layer is 10 μm to 30 μm on each side of the base steel sheet.

8 Claims, No Drawings

(51) Int. Cl.

| | |
|---|---|
| *C21D 1/18* | (2006.01) |
| *C21D 8/0247* | (2026.01) |
| *C21D 9/00* | (2006.01) |
| *C21D 9/46* | (2006.01) |
| *C21D 9/48* | (2006.01) |
| *C22C 21/02* | (2006.01) |
| *C22C 21/04* | (2006.01) |
| *C22C 38/00* | (2006.01) |
| *C22C 38/02* | (2006.01) |
| *C22C 38/04* | (2006.01) |
| *C22C 38/60* | (2006.01) |
| *C23C 2/12* | (2006.01) |
| *C23C 2/26* | (2006.01) |
| *C23C 2/28* | (2006.01) |
| *C23C 2/40* | (2006.01) |
| *C23C 28/00* | (2006.01) |
| *C23C 30/00* | (2006.01) |

(56) References Cited

U.S. PATENT DOCUMENTS

| | | |
|---|---|---|
| 2021/0164080 A1 | 6/2021 | Fujita et al. |
| 2022/0025498 A1 | 1/2022 | Suzuki et al. |
| 2022/0040957 A1 * | 2/2022 | Oh ............................ C23C 2/40 |
| 2022/0389553 A1 | 12/2022 | Tabata |

FOREIGN PATENT DOCUMENTS

| | | | | |
|---|---|---|---|---|
| EP | 3889315 | A1 | 10/2021 | |
| JP | 2003045845 | A | 2/2003 | |
| JP | 2004238682 | A * | 8/2004 | |
| JP | WO2020111230 | A1 | 2/2021 | |
| WO | 2016034476 | A1 | 3/2016 | |
| WO | 2018221738 | A1 | 12/2018 | |
| WO | 2019111931 | A1 | 6/2019 | |
| WO | 2020111230 | A1 | 6/2020 | |
| WO | WO-2020111883 | A1 * | 6/2020 | ........... C23C 28/021 |
| WO | 2021100842 | A1 | 5/2021 | |

OTHER PUBLICATIONS

Feb. 13, 2024, Official Decision of Refusal issued by the Japan Patent Office in the corresponding Japanese Patent Application No. 2023-511876 with English language Concise Statement of Relevance.

Jan. 24, 2023, International Search Report issued in the International Patent Application No. PCT/JP2022/042769.

Jun. 13, 2024, the Extended European Search Report issued by the European Patent Office in the corresponding European Patent Application No. 22920452.4.

Nov. 21, 2023, Notification of Reasons for Refusal issued by the Japan Patent Office in the corresponding Japanese Patent Application No. 2023-511876 with English language Concise Statement of Relevance.

Jan. 8, 2026, Office Action issued by the Ministry of Intellectual Property in the corresponding Korean Patent Application No. 10-2024-7021505 with English language concise statement of relevance.

* cited by examiner

STEEL SHEET FOR HOT PRESS FORMING, METHOD OF PRODUCING STEEL SHEET FOR HOT PRESS FORMING, AND METHOD OF PRODUCING HOT PRESSED MEMBER

TECHNICAL FIELD

The present disclosure relates to a steel sheet for hot press forming, a method of producing a steel sheet for hot press forming, a hot pressed member, and a method of producing a hot pressed member.

BACKGROUND

In the automobile field, steel sheets, in particular coated or plated steel sheets that include a surface coated or plated layer, are used for producing various members. In recent years, there has been a demand for further strength improvement of base steel sheets in order to improve strength and reduce weight of members. Typically, however, increasing strength of steel sheets reduces press formability, making obtaining complex component shapes more difficult. In particular, suspension parts such as chassis and structural members for framework such as B-pillars have complex shapes and are therefore difficult to form.

Against this background, the application of hot press forming technology, in which forming is performed hot instead of cold, is increasing. Hot press forming is a forming method in which a steel sheet is heated to the temperature range of austenite single phase (around 900° C.), then press formed at high temperature, and simultaneously rapidly cooled (quenched) by contact with the press mold. Press forming is performed in a heated and softened state, followed by quenching to increase strength, and therefore hot press forming is able to achieve both high strength and press formability of steel sheets.

In particular, Al coated steel sheets have attracted attention as steel sheets for hot press forming due to having excellent high temperature oxidation resistance, and various Al coated steel sheets suitable for hot press forming and hot pressed members using the Al coated steel sheets have been proposed.

For example, in Patent Literature (PTL) 1, an Al coated steel sheet for hot press forming is proposed that includes an Al coated layer containing 1 mass % to 15 mass % Si and 0.5 mass % to 10 mass % Mg.

Further, in PTL 2, a hot pressed member is proposed that includes a steel material, an Al—Fe intermetallic compound layer formed on the steel material, and an oxide coating layer of a specific composition formed on the Al—Fe intermetallic compound layer.

In PTL 3, an Al coated steel sheet is proposed that includes an Al coated layer containing a total of 0 mass % to 3 mass % of one or both of Mg and Ca.

In PTL 4, an Al coated steel sheet is proposed that includes an Al coated layer containing 0.1 wt % to 0.5 wt % of an alloying element such as Mg and an oxide of the alloying element formed on the Al coated layer.

CITATION LIST

Patent Literature

PTL 1: JP 2003-034845 A
PTL 2: WO 2018/221738 A1
PTL 3: WO 2019/111931 A1
PTL 4: WO 2016/034476 A1

SUMMARY

Technical Problem

However, conventional technologies such as those proposed in PTL 1 to 4 do not provide sufficient measures against hydrogen embrittlement caused by hydrogen entering steel during production and use.

That is, as mentioned above, hot press forming is widely used in production of structural members for frameworks of automobiles and the like. Strength required for hot pressed members has been mainly 1.5 GPa grade tensile strength after hot press forming, but for further weight reduction of automotive bodies, higher strength is desired, such as 1.8 GPa grade tensile strength or more.

However, hydrogen embrittlement of steel material becomes more pronounced with increasing strength. Therefore, more advanced measures against hydrogen embrittlement are sought to handle further strength increase.

Diffusible hydrogen, which causes hydrogen embrittlement, may be divided into two main causes of hydrogen entry into steel: hydrogen entry during production of hot pressed members, and hydrogen entry caused by corrosion reactions during actual use of hot pressed members.

To reduce the amount of hydrogen entry due to corrosion, improving corrosion resistance of hot pressed members during actual use is required. More specifically, hot pressed members are typically used in a coated condition, and therefore post-coating corrosion resistance needs to be improved.

Hydrogen entering during production of a hot pressed member includes hydrogen introduced during production of a steel sheet for hot press forming, hydrogen introduced in hot press forming, hydrogen introduced in coating, and the like, but in the case of a hot pressed member made from an Al coated steel sheet, the amount of hydrogen introduced during hot press forming is known to be extremely large.

Therefore, when an Al coated steel sheet is used as a material, reducing diffusible hydrogen content introduced during hot press forming is particularly important.

Therefore, in order to respond to further increases in strength of hot pressed members, in addition to providing the finally-obtained hot pressed members with excellent post-coating corrosion resistance, reduction in the diffusible hydrogen content introduced during hot press forming is sought.

According to the steel sheet for hot press forming proposed in PTL 1, Si and Mg are added to the coated layer to improve post-coating corrosion resistance. However, PTL 1 only focuses on post-coating corrosion resistance and heat resistance, and no consideration is given to hydrogen introduced during hot press forming.

Further, regarding the hot pressed member proposed in PTL 2, only post-coating corrosion resistance is focused on, and no consideration is given to hydrogen introduced during hot press forming.

According to the Al coated steel sheet proposed in PTL 3, only productivity and corrosion resistance are focused on, and no consideration is given to hydrogen introduced during hot press forming.

According to PTL 4, the amount of hydrogen introduced during hot press forming is reduced by adding 0.1 wt % to 0.5 wt % of an alloying element such as Mg to the Al coated layer. However, investigations by the inventors revealed that the Al coated steel sheet proposed in PTL 4 does not sufficiently reduce the amount of hydrogen introduced in hot press forming.

Thus, the conventional technologies proposed in PTL 1 to 4 do not provide sufficient measures against hydrogen embrittlement, and have not been able to achieve high levels of both reduction in diffusible hydrogen content introduced in hot press forming and improvement in post-coating corrosion resistance.

Hydrogen entry in hot press forming is known to be caused by a reaction between moisture in the atmosphere and the coated layer. That is, metal that makes up the coated layer reacts with moisture in the heat treatment atmosphere, and hydrogen atoms produced as the metal is oxidized enter into the steel.

Therefore, the dew point in the atmosphere may be lowered by introducing dry air into the heating furnace or the like to reduce the amount of hydrogen entry during the hot press forming. However, the need for a facility to produce dry air leads to increased costs. Further, the heating furnace used for heating before hot press forming has a furnace structure with multiple inlets and outlets for blanks (steel sheets before press forming), and therefore stably controlling the dew point of the internal atmosphere is difficult.

Therefore, a technology is sought that can reduce diffusible hydrogen content after hot press forming without controlling the atmosphere dew point.

In view of the technical problems described above, it would be helpful to provide a steel sheet for hot press forming that can reduce diffusible hydrogen content introduced in hot press forming without controlling the atmosphere dew point and may be used to obtain a hot pressed member that has excellent post-coating corrosion resistance.

Solution to Problem

As a result of intensive research, the inventors made the following discoveries.

(1) In order to keep diffusible hydrogen content after hot press forming low, regardless of the atmosphere dew point, it is necessary to use a coated layer containing Si, Mg, and at least one of Ca or Sr, and to reduce concentration of Mg solute in the Al phase in the coated layer to less than 1 mass %. Further, average thickness of the coated layer needs to be 30 μm or less.

(2) In order to reduce hydrogen entry due to corrosion in the use environment of a hot pressed member, in addition to use of the coated layer, the average thickness of the coated layer needs to be 10 μm or more.

The present disclosure is based on the discoveries described above, and primary features of the present disclosure are as described below.

1. A steel sheet for hot press forming, comprising a base steel sheet and a coated layer on both sides of the base steel sheet, wherein the coated layer comprises a chemical composition containing (consisting of)

Si: 7 mass % to 11 mass %,

Mg: 0.6 mass % to 1.9 mass %, one or both of Ca and Sr: in total, 1.0% to 10% of Mg in atomic concentration, and Fe: 0 mass % to 30 mass %, with the balance being Al and inevitable impurity, wherein concentration of Mg solute in Al phase in the coated layer is less than 1 mass %, and average thickness of the coated layer is 10 μm or more and 30 μm or less on each side of the base steel sheet.

2. The steel sheet for hot press forming according to 1, above, wherein the chemical composition of the coated layer further contains at least one selected from the group consisting of Mn, V, Cr, Mo, Ti, Ni, Co, Sb, Zr, and B, totaling 2 mass % or less.

3. A method of producing a steel sheet for hot press forming, the method comprising:

immersing a base steel sheet in a hot-dip coating bath for 1 s or more, wherein the hot-dip coating bath comprises a chemical composition containing (consisting of)

Si: 7 mass % to 11 mass %,

Mg: 0.6 mass % to 1.9 mass %, one or both of Ca and Sr: in total, 1.0% to 10% of Mg in atomic concentration, and Fe: 0 mass % to 5 mass %, with the balance being Al and inevitable impurity; and cooling to the solidification point of the hot-dip coating bath at an average cooling rate of 20° C./s or less.

4. The method of producing a steel sheet for hot press forming according to 3, above, wherein the chemical composition of the hot-dip coating bath further contains at least one selected from the group consisting of Mn, V, Cr, Mo, Ti, Ni, Co, Sb, Zr, and B, totaling 2 mass % or less.

5. A hot pressed member comprising:

steel material;

an Al—Fe intermetallic compound layer formed on both sides of the steel material; and an oxide coating layer formed on the Al—Fe intermetallic compound layer and containing Mg and one or both selected from Ca and Sr, wherein diffusible hydrogen concentration in the steel material is 0.25 mass ppm or less.

6. A method of producing a hot pressed member, the method comprising:

heating a steel sheet for hot press forming; and hot press forming the steel sheet for hot press forming heated in the heating, wherein the steel sheet for hot press forming comprises a base steel sheet and a coated layer on both sides of the base steel sheet, the coated layer comprises a chemical composition containing (consisting of)

Si: 7 mass % to 11 mass %,

Mg: 0.6 mass % to 1.9 mass %, one or both of Ca and Sr: in total, 1.0% to 10% of Mg in atomic concentration, and Fe: 0 mass % to 30 mass %, with the balance being Al and inevitable impurity, wherein concentration of Mg solute in Al phase in the coated layer is less than 1 mass %, average thickness of the coated layer is 10 μm or more and 30 μm or less on each side of the base steel sheet, and in the heating, temperature is increased from a heating start temperature of 50° C. or less to a heating temperature that is from the Ac3 transformation temperature of the base steel sheet to 1000° C.

7. The method of producing a hot pressed member according to 6, above, wherein the chemical composition of the coated layer further contains at least one selected from the group consisting of Mn, V, Cr, Mo, Ti, Ni, Co, Sb, Zr, and B, totaling 2 mass % or less.

5

6

8. The method of producing a hot pressed member according to 6 or 7, above, wherein in the heating, the steel sheet for hot press forming after the temperature is increased is further held at the heating temperature for a holding time of 300 s or less.

Advantageous Effect

According to the present disclosure, diffusible hydrogen concentration after hot press forming can be stably kept at a low level without dew point control to obtain a hot pressed member that has a low risk of hydrogen embrittlement. Further, a hot pressed member having excellent post-coating corrosion resistance is obtainable. Therefore, a hot pressed member having extremely high hydrogen embrittlement resistance is obtainable.

DETAILED DESCRIPTION

Embodiments of the present disclosure are described in detail below. The following merely describes preferred embodiments of the present disclosure, and the present disclosure is by no means limited to the embodiments described. Further, "%" used as a unit of content indicates "mass %" unless otherwise specified.

[Steel Sheet for Hot Press Forming]

The steel sheet for hot press forming according to an embodiment of the present disclosure is a steel sheet for hot press forming consisting of a base steel sheet and a coated layer provided on both sides of the base steel sheet.

• Coated Layer

The chemical composition of the coated layer of the steel sheet for hot press forming is one of the largest factors affecting diffusible hydrogen content in a member after hot press forming. According to the present disclosure, it is extremely important that the coated layer have a chemical composition consisting of Si: 7% to 11%, Mg: 0.6% to 1.9%, one or both of Ca and Sr: in total, 1.0% to 10% of Mg in atomic concentration, and Fe: 0% to 30%, with the balance being Al and inevitable impurity. The reasons for limiting the chemical composition of the coated layer are explained below.

Si: 7% to 11%

Si alloys with Al and Fe during hot press forming to form an Al—Fe—Si intermetallic compound. The Al—Fe—Si intermetallic compound is hard and electrochemically inert, which contributes to improved corrosion resistance, in particular post-coating corrosion resistance. However, when Si concentration in the coated layer is less than 7%, most of the Si is solute in an Al—Fe intermetallic compound after hot press forming, and the Al—Fe—Si intermetallic compound is not formed, resulting in reduced post-coating corrosion resistance. The Si concentration of the coated layer is therefore 7% or more. On the other hand, when the Si concentration exceeds 11%, single-phase Si remains after hot press forming. Single-phase Si functions as an active cathode and reduces corrosion resistance. The Si concentration of the coated layer is therefore 11% or less.

Mg: 0.6% to 1.9%

Diffusible hydrogen in a hot pressed member is caused by oxidation of metal in the coated layer by water vapor contained in the atmosphere during hot press forming. For example, Al and Si in a metallic state exist in the surface layer of a typical Al coated steel sheet for hot press forming, and hydrogen atoms are generated when Al and Si react with water vapor. At this time, the valence of Al is 3, and therefore three hydrogen atoms are generated when Al reacts with water vapor. Similarly, the valence of Si is 4, and therefore four hydrogen atoms are generated when Si reacts with water vapor. In contrast, the valence of Mg is 2, and therefore generates less hydrogen per atom than Al and Si. In addition, Mg is more readily oxidizable than Al and Si, and therefore water vapor reacts preferentially with Mg when Mg is present. Accordingly, an amount of hydrogen generation may be expected to be reduced by including Mg in the coated layer.

However, study found that simple addition of Mg alone does not necessarily reduce the diffusible hydrogen content in a hot pressed member, but rather may significantly increase it. That is, to reduce diffusible hydrogen content in a hot pressed members, Mg concentration in the coated layer needs to be 0.6% to 1.9%. When the Mg concentration in the coated layer is 0.6% to 1.9%, Mg is preferentially oxidized, which helps prevent oxidation of Al, the matrix of the coated layer, and Mg forms a thin and dense oxide coating, which minimizes hydrogen generation due to reaction between metal in the coated layer and water vapor.

When the Mg concentration is less than 0.6%, Al oxidation is not sufficiently inhibited and diffusible hydrogen content increases. The Mg concentration is therefore 0.6% or more. The Mg concentration is preferably 0.8% or more. The Mg concentration is more preferably 0.9% or more. On the other hand, when the Mg concentration is more than 1.9%, the oxide formed by the oxidation of Mg changes from film-like to granular, resulting in reduced protection against oxidation. As a result, diffusible hydrogen content increases. The Mg concentration is therefore 1.9% or less. The Mg concentration is preferably 1.6% or less. The Mg content is more preferably 1.2% or less.

Ca, Sr: In Total, 1.0% to 10% of Mg in Atomic Concentration

As mentioned above, Mg concentration of 0.6% to 1.9% can reduce the amount of hydrogen entry during production, but this alone does not sufficiently reduce diffusible hydrogen content in a hot pressed member. Therefore, according to the present disclosure, the coated layer contains one or both of Ca and Sr in a total atomic concentration that is 1.0% to 10% of Mg.

The addition of one or both of Ca and Sr to the coated layer in the above amount can very effectively reduce diffusible hydrogen content in a hot pressed member. Ca and Sr are more easily oxidized than Mg and exist exclusively as oxides in a hot pressed member. By including an appropriate amount of these elements in addition to Mg in the coated layer of a steel sheet for hot press forming, oxidation of Mg as well as Al can be reduced.

The mechanism by which addition of Ca and Sr reduces the diffusible hydrogen content is not necessarily clear. However, the addition of one or both of Ca and Sr does not reduce diffusible hydrogen content in the absence of Mg, suggesting that Ca and Sr reduce diffusible hydrogen content by acting on Mg. Specifically, it is presumed that Ca and Sr contribute to enhancement of the antioxidant effect of Mg and a change in the state of Mg in the coated layer described below, that is, a decrease in Mg solute in Al. Therefore, addition of Mg and, depending on the amount, addition of Ca or Sr, are necessary according to the present disclosure.

Ca and Sr may be used interchangeably and total atomic concentration may be 1.0% to 10% of Mg. Only Ca, only Sr, or both Ca and Sr may be added.

When the total amount of Ca and Sr added is less than 1.0% of Mg in atomic concentration, oxidation of Mg and resulting reduction in hydrogen generation are not sufficiently effective. Therefore, as a percentage of Mg in atomic concentration, the total amount of Ca and Sr added is 1.0% or more. The total amount of Ca and Sr added is preferably 2.0% or more. The total amount of Ca and Sr added is more preferably 3.0% or more. On the other hand, when the total amount of Ca and Sr added exceeds 10% of Mg in atomic concentration, Ca and Sr themselves become significantly oxidized and hydrogen content instead increases. Therefore, as a percentage of Mg in atomic concentration, the total amount of Ca and Sr added is 10% or less. The total amount of Ca and Sr added is 7% or less. The total amount of Ca and Sr added is 4% or less.

Fe: 0% to 30%

When forming the coated layer by hot-dip coating, Fe may be included in the coated layer by reacting and alloying of the coating bath and the base steel sheet. Further, when hot-dip coating is performed, Fe is liquated from the base steel sheet to the coating bath. Therefore, Fe contained in the coating bath may be incorporated into the coated layer.

Fe concentration in the coated layer is mainly determined by thickness of the alloy phase formed by the reaction between the coating bath and the base steel sheet, and therefore varies with coating bath temperature, temperature and surface condition of the sheet when entering the coating bath, and time the sheet stays in the coating bath. When Fe concentration in the coated layer exceeds 30%, an excessive amount of Fe-containing intermetallic compounds precipitate in the coated layer, resulting in non-uniform alloying and surface oxidation in the surface during hot press forming. As a result, the diffusible hydrogen reduction effect due to addition of Mg and Ca or Sr is not fully achieved. Fe concentration in the coated layer is therefore 30% or less. Fe concentration in the coated layer is preferably 18% or less. Fe concentration in the coated layer is more preferably 12% or less. On the other hand, from the viewpoint of reducing intermetallic compounds in a steel sheet for hot press forming, a lower Fe concentration in the coated layer is preferable. A lower limit of Fe concentration in the coated layer is therefore 0%.

The coated layer according to an embodiment of the present disclosure has a chemical composition consisting of the above components, with the balance being Al and inevitable impurity. Inevitable impurity includes components derived from the base steel sheet and components derived from inevitable impurity in the coating bath. The total content of inevitable impurity is not particularly limited. However, from the viewpoint of preventing deterioration of corrosion resistance of the coated layer caused by precipitation of intermetallic compounds having a potential difference with the coated layer, the total amount of inevitable impurity in the coated layer is preferably 1% or less. The smaller the amount of inevitable impurity, the better, and therefore a lower limit is not particularly limited and may be 0% in total.

According to another embodiment of the present disclosure, the chemical composition of the coated layer further contains at least one selected from the group consisting of Mn, V, Cr, Mo, Ti, Ni, Co, Sb, Zr, and B, totaling 2% or less. These elements are not essential components and may be optionally included in the coated layer. Therefore, a lower limit of the total content of these elements is not particularly limited and may be 0%.

The chemical composition of the coated layer of a steel sheet for hot press forming may be analyzed by inductively coupled plasma atomic emission spectrometry (ICP-AES). Specifically, first, a 30 mm×30 mm sample for measurement is cut from a steel sheet for hot press forming. The sample for measurement is then immersed in 5% hydrochloric acid to dissolve the coated layer to obtain a solution. To the 5% hydrochloric acid, 3.5 g/L of hexamethylenetetramine and 0.5 g/L of Hibiron produced by Sugimura Chemical Industrial Co., Ltd. are added as inhibitors. The obtained solution is analyzed by ICP-AES to quantify each element in the coated layer.

Concentration of Mg Solute in Al Phase: Less than 1%

The coated layer of the steel sheet for hot press forming contains 0.6% to 1.9% Mg, as described above. Mg in the Al—Si—Mg coated layer containing 0.6% to 1.9% Mg may take two states. One is when Mg is present with Si as an intermetallic compound $Mg_2Si$, and the other is when Mg is solute in the Al phase. Although forming $Mg_2Si$ is more stable on a phase equilibrium diagram, Mg may also exist as a solute in the Al phase depending on coating production conditions, such as when the cooling rate after hot-dip coating is very high, for example.

Experimental results found that the reduction in diffusible hydrogen content due to Mg is obtainable when Mg is present as $Mg_2Si$, and the contribution of Mg solute in the Al phase is small. Therefore, to obtain sufficient effect of diffusible hydrogen content reduction due to Mg, concentration of Mg solute in the Al phase is less than 1%. Concentration of Mg solute in the Al phase is preferably less than 0.6%. Concentration of Mg solute in the Al phase is more preferably less than 0.3%. On the other hand, a lower limit of concentration of Mg solute in the Al phase is not particularly limited and may be 0%. However, even when reduced to less than 0.1%, the effect of diffusible hydrogen content reduction is small, and therefore concentration of Mg solute in the Al phase may be 0.1% or more.

The concentration of Mg solute in the Al phase may be measured by analyzing a cross-section of a steel sheet for hot press forming using an electron probe microanalyzer (EPMA). A sample for the measurement may be cut by shearing from a steel sheet for hot press forming.

The addition of either or both Ca and Sr to the coating bath reduces the solute content of Mg in Al. Therefore, the addition of these elements is effective not only in reducing hydrogen generation during heat treatment, but also in reducing solute Mg.

• Average Thickness of Coated Layer

Average thickness of the coated layer is 10 μm or more and 30 μm or less on each side of the base steel sheet. When the average thickness is less than 10 μm, not only is sufficient corrosion resistance not obtained, but the amount of hydrogen entry due to corrosion increases and delayed fracture resistance is reduced. The average thickness is therefore 10 μm or more. The average thickness is preferably 12 μm or more. The average thickness is more preferably 15 μm or more. On the other hand, when the average thickness exceeds 30 μm, an amount of oxidation of the coated layer becomes large, and therefore even when composition of the coated layer meets the above conditions, diffusible hydrogen content cannot be sufficiently reduced. The average thickness is therefore 30 μm or less. The average thickness is preferably 27 μm or less. The average thickness is more preferably 23 μm or less.

The average thickness of the coated layer includes thickness of the Fe—Al reaction layer and oxide layer on the steel sheet base metal.

The average thickness of the coated layer may be measured by observing a cross-section of a steel sheet for hot press forming with a scanning electron microscope (SEM). A sample for the measurement may be cut by shearing from a steel sheet for hot press forming.

The average thickness of the coated layer on one side of the base steel sheet and the average thickness of the coated layer on the other side may be the same or different. In other words, the average thickness of the coated layer on one side of the base steel sheet is 10 μm or more and 30 μm or less, and the average thickness of the coated layer on the other side is also 10 μm or more and 30 μm or less.

The steel sheet for hot press forming according to the present disclosure may be a steel sheet consisting of a base steel sheet and the coated layer. However, depending on purpose and to an extent that does not affect the working effects described in the present disclosure, one or both of a lower layer coating and an upper layer coating may be included. Here, lower layer coating refers to a coating between the base steel sheet and the coated layer, and upper layer coating refers to a coating on the surface of the coated layer. For example, use of a base coat layer as the lower coating is preferred. As the base coat layer, a base coat layer mainly composed of Fe or Ni is an example. Examples of the upper layer coating include a post-coating layer mainly composed of Ni and a chemical conversion treatment coating containing phosphate, a zirconium compound, a titanium compound, and the like.

• Base Steel Sheet

Any steel sheet may be used as the base steel sheet without particular limitation. The base steel sheet may be a hot-rolled steel sheet or a cold-rolled steel sheet.

From the viewpoint of obtaining a hot pressed member having tensile strength exceeding 980 MPa grade after hot press forming, the base steel sheet preferably has a chemical composition containing, in mass %, C: 0.05% to 0.50%,
    Si: 0.1% to 1.0%,
    Mn: 0.5% to 3.0%,
    P: 0.02% or less,
    S: 0.01% or less,
    Al: 0.10% or less, and
    N: 0.01% or less,
    with the balance being Fe and inevitable impurity. The reasons why the chemical composition above are preferred are explained below.

C: 0.05% to 0.50%

C is an element that has an effect of increasing strength by forming microstructures such as martensite. From the viewpoint of obtaining high strength exceeding 980 MPa grade, C content is preferably 0.05% or more. The C content is more preferably 0.10% or more. However, when the C content exceeds 0.50%, toughness of a spot welded portion decreases. Accordingly, the C content is preferably 0.50% or less. The C content is more preferably 0.45% or less. The C content is even more preferably 0.43% or less. The C content is most preferably 0.40% or less.

Si: 0.1% to 1.0%

Si is an effective element in strengthening steel to obtain good material properties. To achieve this effect, Si content is preferably 0.1% or more. The Si content is more preferably 0.2% or more. However, when the Si content exceeds 1.0%, ferrite is stabilized and therefore hardenability is reduced. Accordingly, the Si content is preferably 1.0% or less. The Si content is more preferably 0.4% or less. The Si content is even more preferably 0.3% or less.

Mn: 0.5% to 3.0%

Mn is an effective element for securing strength after cooling over a wide range of cooling rates. To secure mechanical properties and strength, Mn content is preferably 0.5% or more. The Mn content is more preferably 0.7% or more. The Mn content is even more preferably 1.0% or more. On the other hand, when the Mn content exceeds 3.0%, not only do costs increase, but the effect saturates. Accordingly, the Mn content is preferably 3.0% or less. The Mn content is more preferably 2.5% or less. The Mn content is even more preferably 2.0% or less. The Mn content is most preferably 1.5% or less.

P: 0.1% or Less

When P content exceeds 0.1%, balance between strength and ductility is reduced as a result of degradation in local ductility due to grain boundary embrittlement caused by P segregation at austenite grain boundaries during casting. Accordingly, the P content is preferably 0.1% or less. A lower limit of the P content is not particularly limited, and may be 0%. However, from a refining cost perspective, the P content is preferably 0.01% or more.

S: 0.01% or Less

S forms as inclusions such as MnS, which cause degradation of impact resistance and cracking along metal flow in welded portions. Accordingly, reducing S as much as possible is desirable. Specifically, S content is preferably 0.01% or less. From the viewpoint of good stretch flangeability, the S content is more preferably 0.005% or less. The S content is even more preferably 0.001% or less. A lower limit of the S content is not particularly limited, and may be 0%. However, from a refining cost perspective, the S content is preferably 0.0002% or more.

Al: 0.10% or Less

When Al content exceeds 0.10%, blanking workability and hardenability of the blank sheet decrease. Accordingly, the Al content is preferably 0.10% or less. The Al content is more preferably 0.07% or less. The Al content is even more preferably 0.04% or less. A lower limit of the Al content is not particularly limited. From the viewpoint of securing the effect as a deoxidizing material, the Al content is preferably 0.01% or more.

N: 0.01% or Less

When N content exceeds 0.01%, AlN nitrides are formed during hot rolling or heating before hot press forming, reducing blanking workability and hardenability of the blank sheet. Accordingly, the N content is preferably 0.01% or less. A lower limit of the N content is not particularly limited, and may be 0%. However, from a refining cost perspective, the N content is preferably 0.001% or more.

Further, in order to further improve properties, the chemical composition of the base steel sheet may further contain at least one selected from the group consisting of Nb: 0.10% or less, Ti: 0.10% or less, B: 0.0002% to 0.010%, Cr: 0.1% to 1.0%, and Sb: 0.003% to 0.10%.

Nb: 0.10% or Less

Nb is an effective component for strengthening steel, but excessive content increases rolling load. Therefore, when Nb is included, Nb content is 0.10% or less. The Nb content is preferably 0.06% or less. The Nb content is more preferably 0.03% or less. A lower limit of the Nb content is not particularly limited, and may be 0%. However, from a refining cost perspective, the Nb content is preferably 0.005% or more.

Ti: 0.10% or Less

Ti, like Nb, is also effective in strengthening steel, but excessive content reduces shape fixability. Therefore, when Ti is included, Ti content is 0.10% or less. The Ti content is preferably 0.03% or less. A lower limit of the Ti content is not particularly limited, and may be 0%. However, from a refining cost perspective, the Ti content is preferably 0.003% or more.

B: 0.0002% to 0.010%

B is an element that has an effect of inhibiting the formation and growth of ferrite from austenite grain boundaries. When B is included, in order to achieve the effect, B content is 0.0002% or more. The B content is more preferably 0.0010% or more. However, excessive B content greatly impairs formability. Therefore, when B is included, the B content is 0.010% or less. The B content is preferably 0.005% or less.

Cr: 0.1% to 1.0%

Cr, like Mn, is an element that contributes to strengthening steel and improving hardenability. When Cr is added, to obtain this effect, Cr content is 0.1% or more. The Cr content is preferably 0.2% or more. On the other hand, Cr is expensive, and therefore adding more than 1.0% significantly increases costs. Therefore, when Cr is included, the Cr content is 1.0% or less. The Cr content is preferably 0.7% or less. The Cr content is more preferably 0.4% or less.

Sb: 0.003% to 0.10%

Sb is an element that has an effect of inhibiting decarburization of a steel sheet surface layer during annealing of the base sheet for coating. When Sb is included, to obtain the effect, Sb content is 0.003% or more. The Sb content is preferably 0.005% or more. However, when the Sb content exceeds 0.10%, rolling load increases, resulting in lower productivity. Therefore, when Sb is included, the Sb content is 0.10% or less. The Sb content is preferably 0.05% or less. The Sb content is more preferably 0.03% or less.

[Method of Producing Steel Sheet for Hot Press Forming]

According to an embodiment of the present disclosure, a steel sheet for hot press forming may be produced by immersing a base steel sheet in a hot-dip coating bath that has a defined chemical composition for 1 s or more, followed by cooling to the solidification point of the hot-dip coating bath at an average cooling rate of 20° C./s or less.

• Base Steel Sheet

Any steel sheet may be used as the base steel sheet without particular limitation. A base steel sheet that may preferably be used is as described in the previous description of a steel sheet for hot press forming.

Prior to hot-dip coating, the base steel sheet may be subjected to any pretreatment. For example, one or both of pickling and annealing are preferably applied as pretreatment.

For example, when a hot-rolled steel sheet is used as the base steel sheet, pickling followed by immersion of the hot-rolled steel sheet in the hot-dip coating bath is preferred. The hot rolling and the pickling may be performed according to conventional methods. For example, hydrochloric acid, sulfuric acid, and the like may be used for the pickling.

When a cold-rolled steel sheet is used as the base steel sheet, the pickling of the hot-rolled steel sheet followed by cold rolling to obtain the cold-rolled steel sheet is preferred. Rolling reduction of cold rolling is not particularly limited and may be 30% to 90%, for example. Rolling reduction of 30% or more reliably prevents deterioration of mechanical properties, and rolling reduction of 90% or less reliably avoids an increase in rolling costs.

Recrystallization annealing, for example, may be used as the annealing. For example, cleaning by degreasing and the like then, in an annealing furnace, heat treatment by heating the steel sheet to a defined temperature in a heating zone followed by a defined heat treatment in a soaking zone. Treatment at temperature conditions at which required mechanical properties are obtained is preferred. Further, the atmosphere in the annealing furnace is preferably a reducing atmosphere for Fe to activate the surface layer of the steel sheet before the coating treatment. Any reducing gas atmosphere may be used as the reducing atmosphere, without any particular limitation.

• Hot-Dip Coating Bath

Next, the base steel sheet is immersed in the hot-dip coating bath to form the coated layer on the surface of the base steel sheet.

The hot-dip coating bath has a chemical composition containing

Si: 7% to 11%,

Mg: 0.6% to 1.9%, one or both of Ca and Sr: in total, 1.0% to 10% of Mg in atomic concentration, and Fe: 0% to 5%, with the balance being Al and inevitable impurity.

The reasons for limiting the concentrations of Si, Mg, Ca, and Sr in the hot-dip coating bath to the above ranges are the same as those for limiting the composition of the coated layer. However, Fe dissolved from the steel sheet or bath equipment is present in the coating bath. When the Fe concentration in the coating bath exceeds 5%, the amount of dross in the bath becomes excessive, and appearance quality deteriorates due to adhesion to the coated steel sheet. The Fe concentration in the coating bath is therefore 5% or less. The Fe concentration in the coating bath is preferably 3% or less. The Fe concentration in the coating bath is more preferably 1% or less. From the viewpoint of appearance quality, the lower the Fe concentration in the coating bath, the better. A lower limit of Fe concentration in the coating bath is therefore 0%.

The inevitable impurity includes components derived from the base steel sheet and inevitable impurity in the metal material (ingots and the like) used to supply hot-dip coating bath components. The total content of the inevitable impurity is not particularly limited, but is preferably 1% or less in total. The lower the total content of the inevitable impurity, the better, and therefore a lower limit may be 0%.

According to another embodiment of the present disclosure, the chemical composition of the hot-dip coating bath further contains at least one selected from the group consisting of Mn, V, Cr, Mo, Ti, Ni, Co, Sb, Zr, and B, totaling 2% or less.

The composition of the coated layer in a steel sheet for hot press forming is substantially the same as that of the coating bath, as a whole, although Al and Si are slightly lower on the interfacial alloy layer side. Accordingly, the composition of the coated layer may be precisely adjusted by controlling the coating bath composition.

Temperature of the coating bath is preferably in a range from (solidification start temperature+20° C.) to 700° C. A lower limit for the bath temperature is (solidification start temperature+20° C.) because, in order to perform hot-dip coating, the bath temperature must be at least the solidification point of the coating material, and the bath temperature being (solidification start temperature+20° C.) reliably prevents local solidification of components of the coating bath caused by localized drop in bath temperature. On the other hand, an upper limit for the bath temperature is 700° C. because when the bath temperature exceeds 700° C., rapid cooling of the coating after the sheet is lifted from the coating bath becomes difficult, leading to an increase in the thickness of an interfacial alloy layer mainly composed of Al—Fe that is formed at the interface between the coating and the steel sheet.

Further, the temperature of the base steel sheet immersed in the coating bath (entering sheet temperature) is not particularly limited and may be any temperature. However, from the viewpoint of securing coating properties and avoiding changes in bath temperature in continuous hot-dip coating operations, controlling to ±20° C. of the temperature of the coating bath is preferred.

Immersion Time: 1 s or More

The immersion time of the base steel sheet in the hot-dip coating bath is 1 s or more. When the immersion time is less than 1 s, a sufficient coated layer is not formed on the surface of the base steel sheet. An upper limit of the immersion time is not particularly limited. However, excessively long immersion time may increase the thickness of the Al—Fe alloy layer formed at the interface between the coated layer and the base steel sheet. The immersion time is therefore 5 s or less.

Although there is no particular limit to the conditions under which the base steel sheet is immersed in the coating bath, a line speed of 40 m/min to 200 m/min is preferred. Further, immersion length is preferably 5 m to 7 m.

Average Cooling Rate: 20° C./s or Less

The steel sheet after hot-dip coating is then cooled to the solidification point of the hot-dip coating bath at an average cooling rate of 20° C./s or less. Slow cooling at the average cooling rate of 20° C./s or less allows Mg to form $Mg_2Si$ without becoming Mg solute in the Al phase. When the average cooling rate is more than 20° C./s, the amount of Mg solute in the Al phase increases, and the effect of reducing hydrogen entry during hot press forming becomes insufficient. The average cooling rate is therefore 20° C./s or less. The average cooling rate is preferably 12° C./s or less.

A lower limit of the average cooling rate is not particularly limited. However, when the average cooling rate is less than 5° C./s, the coating solidifies slowly, resulting in a sagging pattern on the surface of the coated layer, a noticeable deterioration in appearance, and a decrease in chemical convertibility. Therefore, from the viewpoint of improving appearance and chemical convertibility, the average cooling rate is preferably 5° C./s or more. The average cooling rate is more preferably 8° C./s or more.

In the cooling, it suffices that the steel sheet after hot-dip coating is cooled to the solidification point of the hot-dip coating bath. The cooling may be performed to a temperature below the solidification point. In other words, the cooling stop temperature of the cooling is the solidification point of the hot-dip coating bath or less.

The method of the cooling is not particularly limited and may be any method. The cooling is preferably performed under a nitrogen gas atmosphere. Cooling under a nitrogen gas atmosphere is preferred because an extremely high cooling rate is not required and extensive cooling facilities are not required, making cooling under a nitrogen gas atmosphere highly economical. The nitrogen gas atmosphere may contain 4 vol % or less of hydrogen gas.

The described method of production enables the production of a steel sheet for hot press forming in which diffusible hydrogen concentration after hot press forming is kept stably low, even without dew point control, and enables the production of a hot pressed member that has a low risk of hydrogen embrittlement.

Although not particularly limited, producing steel sheets for hot press forming in a continuous galvanizing line is preferable. As a continuous mode coating facility, either a continuous mode coating facility with a non-oxidizing furnace or a continuous mode coating facility without a non-oxidizing furnace may be used. The steel sheet for hot press forming according to the present disclosure does not require such specialized facilities and may be implemented by typical hot-dip coating facilities, and is therefore excellent in terms of productivity.

After the cooling, further alloying treatment may be applied. Alloying treatment is an efficient way to obtain iron-alloyed coating.

[Hot Pressed Member]

A hot pressed member according to an embodiment of the present disclosure includes a steel material, an Al—Fe intermetallic compound layer formed on both sides of the steel material, and an oxide coating formed on the Al—Fe intermetallic compound layer and containing Mg and one or both selected from Ca and Sr. Diffusible hydrogen concentration in the steel material is 0.25 mass ppm or less.

• Steel Material

Any steel material may be used as the steel material without any particular limitation. A preferred chemical composition of the steel material is the same as the preferred chemical composition of the base steel sheet.

• Al—Fe Intermetallic Compound Layer

By providing a layer consisting of an Al—Fe intermetallic compound to the surface of a hot pressed member, a rate of corrosion (exterior corrosion) may be reduced at locations where the corrosion protection function of the coating is reduced, such as scratched areas of the coating and edges of the coating, and hydrogen generation and entry due to corrosion may be reduced.

The type of Al—Fe intermetallic compound is not particularly limited and may be any Al—Fe intermetallic compound. For example, the Al—Fe intermetallic compound may be at least one selected from the group consisting of $FeAl_3$, $Fe_4Al_{13}$, $Fe_2Al_5$, FeAl, $Fe_3Al$, and $Fe_2Al_5Si$.

Presence or absence of the Al—Fe intermetallic compound layer may be evaluated by X-ray diffraction measurement. Specifically, evaluation is possible by a method described in the EXAMPLES section of the present disclosure.

Thickness of the Al—Fe intermetallic compound layer depends on coated layer thickness of a steel sheet for hot press forming and heat treatment conditions. To secure corrosion resistance, thickness of the Al—Fe intermetallic compound layer is preferably 10 μm or more. Thickness of the Al—Fe intermetallic compound layer is more preferably 13 μm or more. Thickness of the Al—Fe intermetallic compound layer is even more preferably 15 μm or more. Further, from the viewpoint of adhesion of the coated layer, thickness of the Al—Fe intermetallic compound layer is preferably 30 μm or less. Thickness of the Al—Fe intermetallic compound layer is more preferably 28 μm or less. Thickness of the Al—Fe intermetallic compound layer is even more preferably 25 μm or less.

The Al—Fe intermetallic compound layer may include an internal Al—Fe—Si intermetallic compound phase. When the Al—Fe—Si intermetallic compound phase is present in the Al—Fe intermetallic compound layer, then when the Al—Fe intermetallic compound layer corrodes, insulating corrosion products containing $SiO_2$ are formed, and therefore the progress of corrosion is inhibited.

The state of the Al—Fe—Si intermetallic compound phase within the Al—Fe intermetallic compound layer is not particularly limited. For example, the Al—Fe—Si intermetallic compound phase may be distributed as islands within the Al—Fe intermetallic compound layer or distributed in layers that interrupt the Al—Fe intermetallic compound layer.

Presence or absence of the Al—Fe—Si intermetallic compound phase may be evaluated by scanning electron microscopy with energy dispersive X-ray spectroscopy (SEM-EDX). Specifically, evaluation is possible by a method described in the EXAMPLES section of the present disclosure.

The amount of the Al—Fe—Si intermetallic compound phase is not particularly limited. However, a ratio of the area of the Al—Fe—Si intermetallic compound phase to the area of the Al—Fe intermetallic compound layer is preferably 5% or more. The ratio of the area of the Al—Fe—Si intermetallic compound phase to the area of the Al—Fe intermetallic compound layer is more preferably 10% or more.

• Oxide Coating Layer

By providing an oxide coating layer containing Mg and one or both selected from Ca and Sr on the Al—Fe intermetallic compound layer, corrosion rate of the Al—Fe intermetallic compound layer may be reduced.

Thickness of the oxide coating layer depends on coated layer composition of a steel sheet for hot press forming and heat treatment conditions. To secure corrosion resistance, thickness of the oxide coating layer is preferably 100 nm or more. Thickness of the oxide coating layer is more preferably 150 nm or more. Thickness of the oxide coating layer is even more preferably 200 nm or more. On the other hand, from the viewpoint of coating adhesion, thickness of the oxide coating layer is preferably 1000 nm or less. Thickness of the oxide coating layer is more preferably 750 nm or less. Thickness of the oxide coating layer is even more preferably 500 nm or less.

Diffusible Hydrogen Concentration: 0.25 Mass ppm or Less

Diffusible hydrogen concentration in the steel material of a hot pressed member according to the present disclosure is 0.25 mass ppm or less. By controlling diffusible hydrogen concentration in the steel material to 0.25 mass ppm or less, it is possible to reduce a risk of delayed fracture when residual stress is induced by assembly and welding of a hot pressed member. To further reduce the risk of delayed fracture, diffusible hydrogen concentration in the steel material is preferably 0.20 mass ppm or less. Diffusible hydrogen concentration in the steel material is more preferably 0.15 mass ppm or less. A lower limit of diffusible hydrogen content is not particularly limited, and may be 0 mass ppm.

Diffusible hydrogen concentration in the steel material of a hot pressed member may be determined by a thermal desorption analysis method. Specifically, the intermetallic compound layer is removed by grinding and the like, and then the cumulative total value of hydrogen content when heated to 300° C. according to the thermal desorption analysis method is taken as the diffusible hydrogen content.

Material properties of a hot pressed member are not particularly limited and may be designed from the base metal composition and heat treatment conditions according to a function of a component to which the hot pressed member is applied.

Strength of the hot pressed member is not particularly limited, but high strength is desirable because hot pressed members are typically used in applications that require strength, such as components for automobiles. In particular, tensile strength in excess of 1320 MPa is required for framework components such as center pillars that suppress deformation due to a crash. Accordingly, tensile strength of the hot pressed member is preferably higher than 1320 MPa. Tensile strength of the hot pressed member is more preferably higher than 1400 MPa. Tensile strength of the hot pressed member is even more preferably higher than 1470 MPa. An upper limit of tensile strength is not particularly limited. Typically, tensile strength may be 2600 MPa or less. When tensile strength is 2600 MPa or less, toughness is even higher, which is more suitable for use as an automobile member.

Further, when used as a component such as a side member that is required to absorb energy, excellent yield point and elongation are required. Therefore, the yield point of the hot pressed member is preferably higher than 700 MPa. An upper limit of yield point is also not particularly limited. Typically, the yield point may be 2000 MPa or less.

Further, total elongation of the hot pressed member is preferably higher than 4%. An upper limit of total elongation is not particularly limited. Typically, total elongation may be 10% or less.

[Method of Producing Hot Pressed Member]

A method of producing a hot pressed member according to an embodiment of the present disclosure includes heating a steel sheet for hot press forming and hot press forming the steel sheet for hot press forming that has been heated. In the heating, temperature is raised from a heating start temperature of 50° C. or less to a heating temperature that is from the Ac3 transformation temperature of the base steel sheet to 1000° C.

The heating start temperature may be any temperature of 50° C. or less. The heating start temperature is preferably 0° C. or more. Typically, heating may be started at room temperature.

Heating Temperature: Ac3 Transformation Temperature to 1000° C.

When the heating temperature is lower than the Ac3 transformation temperature of the base steel sheet, the strength required as a hot pressed member may not be obtained. The heating temperature is therefore the Ac3 transformation temperature of the base steel sheet or more. The heating temperature is preferably 860° C. or more. On the other hand, when the heating temperature exceeds 1000° C., the oxide coating produced by oxidation of the base metal and the coated layer becomes excessively thick, which deteriorates adhesion of subsequent coating on the resulting hot pressed member. The heating temperature is therefore 1000° C. or less. The heating temperature is preferably 960° C. or less. The heating temperature is more preferably 920° C. or less. The Ac3 transformation temperature of the base steel sheet depends on steel composition and is determined by Formaster® (Formaster is a registered trademark in Japan, other countries, or both) testing.

Time required to raise the temperature from the heating start temperature to the heating temperature (heat-up time) is not particularly limited and may be any time. However, when the heat-up time exceeds 300 s, the oxide coating produced by oxidation of the base metal and the coated layer becomes excessively thick because of longer exposure time to high temperature. Therefore, from the viewpoint of suppressing the deterioration of coating adhesion due to oxides, the heat-up time is preferably 300 s or less. The heat-up time is more preferably 270 s or less. The heat-up time is even more preferably 240 s or less. On the other hand, when the heat-up time is less than 150 s, the coated layer melts excessively during the heating, resulting in fouling of heating equipment and press molds. Therefore, from the viewpoint of preventing fouling of the heating equipment and press molds, the heat-up time is preferably 150 s or more. The heat-up time is more preferably 180 s or more. The heat-up time is even more preferably 210 s or more.

• Holding Time: 300 s or Less

According to another embodiment of the present disclosure, the steel sheet for hot press forming after the heat-up time may be further held at the heating temperature for a holding time of 300 s or less. When the holding time exceeds 300 s, the time of exposure to high temperature becomes excessively long, and the oxide coating produced by oxidation of the base metal and the coated layer becomes excessively thick, which may deteriorate adhesion of subsequent coating on the resulting hot pressed member. Therefore, when holding is performed, the holding time is 300 s or less. The holding time is preferably 210 s or less. The holding time is more preferably 120 s or less. The holding is not required, and therefore a lower limit of the holding time is not particularly limited and may be 0 s. However, from the viewpoint of uniformly austenitizing a steel sheet for hot press forming, the holding time is preferably 10 s or more.

The heating may be performed in any atmosphere. Typically, the lower the dew point of a heating atmosphere, the lower the diffusible hydrogen content of a hot pressed member. However, controlling the heating atmosphere significantly increases production costs. According to the present disclosure, diffusible hydrogen content may be reduced even at a high dew point during heating by using a steel sheet for hot press forming that includes the coated layer described above. Therefore, from the viewpoint of maximizing the effect of reducing diffusible hydrogen content in a steel sheet for hot press forming and reducing facility costs, the heating may be conducted in an atmosphere that has a dew point of 0° C. or more. The dew point may be 5° C. or more. The dew point may be 10° C. or more.

In the heating, a steel sheet for hot press forming may be heated by any method without any particular limitation. For example, furnace heating by an electric furnace or a gas furnace, electrical resistance heating, induction heating, high-frequency heating, flame heating, and the like may be preferably used as a heating method.

After the heating, hot press forming is performed to make a hot pressed member. In the hot press forming, a steel sheet for hot press forming is formed into a desired shape and cooled by the press mold, water, and the like. According to the present disclosure, hot press forming conditions are not particularly limited. Hot press forming at 600° C. to 800° C. is preferred, which is a typical hot press forming temperature range.

EXAMPLES

Specific examples of the present disclosure are described below.

Cold-rolled steel sheets each having a thickness of 1.4 mm were used as the base steel sheets. Each of the cold-rolled steel sheets had the following chemical composition, in mass %, C: 0.34%, Si: 0.25%, Mn: 1.20%, P: 0.005%, S: 0.001%, Al: 0.03%, N: 0.004%, Ti: 0.02%, B: 0.002%, Cr: 0.18%, and Sb: 0.008%, with the balance being Fe and inevitable impurity. For each base steel sheet, the Ac3 transformation temperature was 783° C. and the Ar3 transformation temperature was 706° C.

Each base steel sheet was immersed in a hot-dip coating bath for 1 s or more, followed by $N_2$ gas wiping to produce a steel sheet for hot press forming. Al—Si coating baths having chemical compositions and bath temperatures listed in Tables 1 to 3 were used as the hot-dip coating bath. Further, average cooling rates from the lifting of the steel sheet from the hot-dip coating bath and the solidification point of the hot-dip coating bath were the values listed in Tables 1 to 3.

Chemical compositions, average thicknesses, and concentrations of Mg solute in the Al phase of the coating layers of the resulting steel sheets for hot press forming were respectively measured by the following methods. Measurement results were listed in Tables 4 to 6.

(Chemical Composition of Coated Layer)

From each steel sheet for hot press forming to be evaluated, three 30 mm×30 mm samples were taken by shearing. For each sample, after masking one side, the coated layer on the other side was dissolved by immersing the sample in hydrochloric acid aqueous solution for 10 min. The hydrochloric acid was 5% hydrochloric acid with 3.5 g/L of aqueous solution hexamethylenetetramine and 0.5 g/L of Hibiron produced by Sugimura Chemical Industrial Co., Ltd. added as inhibitors.

Metal components in the resulting solution were quantified by ICP-AES. Further, metal components in residue were quantified because Si may produce a residue consisting mainly of $SiO_2$ in dissolution with hydrochloric acid. Specifically, the residue produced during hydrochloric acid dissolution was filtered off, the residue was alkali fused, and then further acid dissolved. The resulting residue solution was analyzed by ICP-AES to quantify the metal components in the residue.

The amounts of metal in the coated layer were determined by summing the amount of metal components in the solution measured by the above procedure and the amount of metal components in the residue. The same measurements were performed for each of the three samples, and the average of the measured values was taken as the chemical composition of the coated layer.

(Average Thickness of Coated Layer)

The average thickness of the coated layer of each steel sheet for hot press forming was measured by SEM observation. Specifically, first, from each steel sheet for hot press forming, a sample for SEM observation was cut by shearing. A cross-section of the sample was observed by SEM to measure the thickness from the base steel sheet to the surface of the coated layer. For each sample, the measurements were performed at ten randomly selected points, and the arithmetic mean value of obtained values was taken as the average thickness of the coated layer. The average thickness of the coated layer on both surfaces was the same, and values are listed in Tables 4 to 6.

(Concentration of Mg Solute in Al Phase)

The concentration of Mg solute in the Al phase was determined by EPMA analysis. Specifically, first, from each steel sheet for hot press forming, three samples were cut by shearing. For each sample, a cross-section was then observed by SEM to identify an Al phase in the coated layer. Here, the Al phase is a phase of Al that is not a eutectic structure, not an interfacial alloy phase, and not an intermetallic compound phase. The concentration of Mg solute in the identified Al phase was determined by point analysis using EPMA. Each of the three samples was analyzed at ten points each, and the arithmetic mean of the values obtained was taken as the concentration of Mg solute in the Al phase.

The steel sheets for hot press forming were then subjected to hot press forming. Specifically, from each steel sheet for hot press forming, a 100 mm×200 mm test piece was taken, and the test piece was heated from room temperature to the heating temperature listed in Tables 7 to 9 and then held at the heating temperature for the holding time listed in Tables 7 to 9. The heat-up time from room temperature to the heating temperature was 210 s. An electric furnace was used for the heating, and the dew point of the atmosphere in the electric furnace was +15° C.

After the heating, each test piece was removed from the electric furnace and immediately subjected to hot press forming at a forming start temperature of 720° C. using a hat-type press mold to obtain a hot pressed member. The shape of each obtained hot pressed member was 100 mm in flat length on the top surface, 50 mm in flat length on the side surfaces, and 50 mm in flat length on the bottom surface. Further, the bending radius (or bending R) of the press mold was 7 R for both shoulders on the top and bottom surfaces.

(Al—Fe Intermetallic Compound Layer)

Presence or absence of an Al—Fe intermetallic compound layer in the hot pressed members obtained was evaluated by the following method. First, from each hot pressed member, a sample was taken from a flat surface thereof. For each sample, diffraction intensity $I\alpha$ and $I_{AlFemax}$ of were then measured by X-ray diffraction measurement, and when values obtained satisfied the conditions of Expression (1) below, an Al—Fe intermetallic compound layer was judged to be present. A case where an Al—Fe intermetallic compound layer was present is indicated by "O" and a case where an Al—Fe intermetallic compound was absent is indicated by "x".

$$I\alpha/I_{AlFemax} > 0.1$$

Here, $I\alpha$ is the diffraction intensity of the (110) plane of $\alpha$-Fe and $I_{AlFemax}$ is the diffraction intensity of the peak with maximum intensity among diffraction peaks attributed to the Al—Fe intermetallic compound.

The X-ray diffraction measurements were performed under the following conditions.

Incidence angle: 25°
Source: Co-K$\alpha$ (wavelength: 1.79021 Å)
Tube voltage: 45 kV
Tube current: 160 mA (Al—Fe—Si Intermetallic Compound Phase)

When an Al—Fe intermetallic compound layer was present in the hot pressed member, whether an Al—Fe—Si intermetallic compound phase was present in the Al—Fe intermetallic compound layer was further evaluated. Specifically, first, from each hot pressed member, a sample was taken from a flat surface by shearing. For each sample, a cross-section was observed by SEM to obtain a reflected electron image. When a phase having a different contrast from the Al—Fe intermetallic compound layer was present in the reflected electron image, the Si concentration in the phase was measured by EDX. When the Si concentration obtained was 5 mass % or more, the phase was judged to be an Al—Fe—Si intermetallic compound phase. A case where the Al—Fe—Si intermetallic compound phase was present is indicated by "O" and a case where an Al—Fe—Si intermetallic compound was absent is indicated by "x".

(Diffusible Hydrogen Content)

Diffusible hydrogen content in the resulting hot pressed members was measured by the following method. For each hot pressed member, a small piece of 10 mm×15 mm was cut from a flat section that had a low amount of deformation, and the intermetallic compound layer was removed by grinding with a precision die grinder. Then, thermal desorption analysis was performed, and the cumulative total of hydrogen when heating to 300° C. was taken the diffusible hydrogen content. A thermal desorption analyzer produced by J-Science Group was used for the thermal desorption analysis, with argon as the carrier gas and heating rate at 200° C./s.

Further, hydrogen embrittlement properties and post-coating corrosion resistance of the hot pressed members were evaluated by the following procedures.

(Hydrogen Embrittlement Properties)

Hydrogen embrittlement properties of the hot pressed members were evaluated by slow strain rate technique (SSRT) tensile testing. Specifically, from each hot pressed member, ten JIS 13B tensile test pieces were first cut from the top of the press head. For the purpose of reducing hydrogen desorption from the end faces, the cutting operation was performed while the hot pressed members were cooled with liquid nitrogen, and electrogalvanized plating was applied immediately after the test pieces were cut out.

Each of the JIS 13B test pieces were then subjected to an SSRT tensile test to measure total elongation. The crosshead speed in the SSRT tensile test was 0.0002 mm/s. Based on the measurement results of ten test pieces, hydrogen embrittlement properties were evaluated at the following four levels. Here, level 1 or 2 was considered an acceptable pass. The evaluation results are listed in Tables 7 to 9.

1: For all ten test pieces, total elongation≥7%
2: One of the ten test pieces had 5%≤total elongation<7% and the other nine had total elongation≥7%
3: Two of the ten test pieces had 5%≤total elongation<7% and the other eight had total elongation≥7%
4: Three or more of the ten test piece had 5%≤total elongation<7% or one or more of the ten test pieces had total elongation<5%

(Post-Coating Corrosion Resistance)

Post-coating corrosion resistance of hot pressed members was evaluated by corrosion tests. Specifically, test pieces were first prepared by the following procedure. From each hot pressed member, a 50 mm×100 mm flat test piece was cut from the top of the press head. Each flat test piece was successively treated with zinc phosphate chemical conversion treatment and electrodeposition coating to prepare the test piece. The zinc phosphate chemical conversion treatment was performed under standard conditions using a PB—SX35 produced by Nihon Parkerizing Co., Ltd. The electrodeposition coating was applied using a cation electrodeposition coating Electron GT100 produced by Kansai Paint Co., Ltd. to achieve a coating thickness of 15 μm. Baking of the electrodeposition coating was performed at a temperature of 170° C. and held for 20 min.

Each resulting test piece was then subjected to corrosion testing (SAE-J2334), and after 60 cycles, the maximum swelling width on one side from the cross-cut was measured. Based on the maximum swelling width on one side, the post-coating corrosion resistance was evaluated at the following three levels. Here, level 1 was considered an acceptable pass. The evaluation results are listed in Tables 7 to 9.

1: Maximum swelling width on one side<1.5 mm
2: 1.5 mm≤maximum swelling width on one side<3.0 mm
3: 3.0 mm≤maximum swelling width on one side As indicated in Tables 7 to 9, by subjecting the steel sheets for hot press forming to hot press forming, it is possible to obtain hot pressed members having low diffusible hydrogen content, excellent corrosion resistance, and overall excellent hydrogen embrittlement resistance without dew point control in the heat treatment process.

TABLE 1

| | Hot-dip coating bath | | | | | | | | | | | | | | | | | | |
| | Chemical composition (mass %) | | | | | | | | | | | | | | | | (Ca + Sr)/Mg (Atomic concentration ratio) | Bath temp. (° C.) | Cooling Average cooling rate (° C./s) |
| No. | Al | Si | Mg | Ca | Sr | Mn | V | Cr | Mo | Ti | Ni | Co | Sb | Zr | B | Fe | | | |
|---|---|---|---|---|---|---|---|---|---|---|---|---|---|---|---|---|---|---|---|
| 1 | 90 | 9.50 | 0.0 | 0 | 0 | 0 | 0 | 0 | 0 | 0 | 0 | 0 | 0 | 0 | 0 | 0.50 | — | 630 | 10 |
| 2 | 90 | 9.50 | 0.2 | 0 | 0 | 0 | 0 | 0 | 0 | 0 | 0 | 0 | 0 | 0 | 0 | 0.50 | 0.00 | 630 | 10 |
| 3 | 90 | 9.50 | 0.5 | 0 | 0 | 0 | 0 | 0 | 0 | 0 | 0 | 0 | 0 | 0 | 0 | 0.50 | 0.00 | 630 | 10 |
| 4 | 89 | 9.50 | 1.0 | 0 | 0 | 0 | 0 | 0 | 0 | 0 | 0 | 0 | 0 | 0 | 0 | 0.50 | 0.00 | 630 | 10 |
| 5 | 88 | 9.50 | 2.0 | 0 | 0 | 0 | 0 | 0 | 0 | 0 | 0 | 0 | 0 | 0 | 0 | 0.50 | 0.00 | 630 | 10 |
| 6 | 89 | 9.50 | 1.0 | 0.01 | 0 | 0 | 0 | 0 | 0 | 0 | 0 | 0 | 0 | 0 | 0 | 0.50 | 0.63 | 630 | 10 |
| 7 | 89 | 9.50 | 1.0 | 0.02 | 0 | 0 | 0 | 0 | 0 | 0 | 0 | 0 | 0 | 0 | 0 | 0.50 | 1.25 | 630 | 10 |
| 8 | 89 | 9.50 | 1.0 | 0.05 | 0 | 0 | 0 | 0 | 0 | 0 | 0 | 0 | 0 | 0 | 0 | 0.50 | 3.13 | 630 | 5 |
| 9 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 10 | 88 | 9.50 | 1.0 | 0.05 | 0 | 0.50 | 0 | 0 | 0 | 0 | 0 | 0 | 0 | 0 | 0 | 0.50 | 3.13 | 630 | 10 |
| 11 | 88 | 9.50 | 1.0 | 0.05 | 0 | 0 | 0.50 | 0 | 0 | 0 | 0 | 0 | 0 | 0 | 0 | 0.50 | 3.13 | 630 | 10 |
| 12 | 88 | 9.50 | 1.0 | 0.05 | 0 | 0 | 0 | 0.50 | 0 | 0 | 0 | 0 | 0 | 0 | 0 | 0.50 | 3.13 | 630 | 10 |
| 13 | 89 | 9.50 | 1.0 | 0.05 | 0 | 0 | 0 | 0 | 0.20 | 0 | 0 | 0 | 0 | 0 | 0 | 0.50 | 3.13 | 630 | 10 |
| 14 | 89 | 9.50 | 1.0 | 0.05 | 0 | 0 | 0 | 0 | 0 | 0.20 | 0 | 0 | 0 | 0 | 0 | 0.50 | 3.13 | 630 | 10 |
| 15 | 88 | 9.50 | 1.0 | 0.05 | 0 | 0 | 0 | 0 | 0 | 0 | 0.50 | 0 | 0 | 0 | 0 | 0.50 | 3.13 | 630 | 10 |
| 16 | 88 | 9.50 | 1.0 | 0.05 | 0 | 0 | 0 | 0 | 0 | 0 | 0 | 0.50 | 0 | 0 | 0 | 0.50 | 3.13 | 630 | 10 |
| 17 | 89 | 9.50 | 1.0 | 0.05 | 0 | 0 | 0 | 0 | 0 | 0 | 0 | 0 | 0.20 | 0 | 0 | 0.50 | 3.13 | 630 | 10 |
| 18 | 89 | 9.50 | 1.0 | 0.05 | 0 | 0 | 0 | 0 | 0 | 0 | 0 | 0 | 0 | 0.20 | 0 | 0.50 | 3.13 | 630 | 10 |
| 19 | 89 | 9.50 | 1.0 | 0.05 | 0 | 0 | 0 | 0 | 0 | 0 | 0 | 0 | 0 | 0 | 0.10 | 0.50 | 3.13 | 630 | 10 |
| 20 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 21 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 22 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 23 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 24 | 89 | 9.50 | 0.6 | 0.05 | 0 | 0 | 0 | 0 | 0 | 0 | 0 | 0 | 0 | 0 | 0 | 0.50 | 5.50 | 630 | 10 |
| 25 | 89 | 9.50 | 0.7 | 0.05 | 0 | 0 | 0 | 0 | 0 | 0 | 0 | 0 | 0 | 0 | 0 | 0.50 | 4.46 | 630 | 10 |
| 26 | 88 | 9.50 | 1.8 | 0.05 | 0 | 0 | 0 | 0 | 0 | 0 | 0 | 0 | 0 | 0 | 0 | 0.50 | 1.74 | 630 | 10 |
| 27 | 88 | 9.50 | 1.8 | 0.05 | 0 | 0 | 0 | 0 | 0 | 0 | 0 | 0 | 0 | 0 | 0 | 0.50 | 1.74 | 630 | 10 |

TABLE 2

| | Hot-dip coating bath | | | | | | | | | | | | | | | | | | |
| | Chemical composition (mass %) | | | | | | | | | | | | | | | | (Ca + Sr)/Mg (Atomic concentration ratio) | Bath temp. (° C.) | Cooling Average cooling rate (° C./s) |
| No. | Al | Si | Mg | Ca | Sr | Mn | V | Cr | Mo | Ti | Ni | Co | Sb | Zr | B | Fe | | | |
|---|---|---|---|---|---|---|---|---|---|---|---|---|---|---|---|---|---|---|---|
| 28 | 88 | 9.50 | 1.9 | 0.05 | 0 | 0 | 0 | 0 | 0 | 0 | 0 | 0 | 0 | 0 | 0 | 0.50 | 1.65 | 630 | 10 |
| 29 | 88 | 9.50 | 2.1 | 0.05 | 0 | 0 | 0 | 0 | 0 | 0 | 0 | 0 | 0 | 0 | 0 | 0.50 | 1.52 | 630 | 10 |
| 30 | 86 | 9.50 | 4.0 | 0.05 | 0 | 0 | 0 | 0 | 0 | 0 | 0 | 0 | 0 | 0 | 0 | 0.50 | 0.78 | 630 | 10 |
| 31 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 32 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 33 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 34 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 35 | 89 | 9.50 | 1.0 | 0.05 | 0 | 0 | 0 | 0 | 0 | 0 | 0 | 0 | 0 | 0 | 0 | 0.50 | 3.13 | 630 | 15 |
| 36 | 89 | 9.50 | 1.0 | 0.05 | 0 | 0 | 0 | 0 | 0 | 0 | 0 | 0 | 0 | 0 | 0 | 0.50 | 3.13 | 630 | 50 |
| 37 | 89 | 9.50 | 1.0 | 0.013 | 0 | 0 | 0 | 0 | 0 | 0 | 0 | 0 | 0 | 0 | 0 | 0.50 | 0.81 | 630 | 10 |
| 38 | 89 | 9.50 | 1.0 | 0.015 | 0 | 0 | 0 | 0 | 0 | 0 | 0 | 0 | 0 | 0 | 0 | 0.50 | 0.94 | 630 | 10 |
| 39 | 89 | 9.50 | 1.0 | 0.15 | 0 | 0 | 0 | 0 | 0 | 0 | 0 | 0 | 0 | 0 | 0 | 0.50 | 9.38 | 630 | 10 |
| 40 | 89 | 9.50 | 1.0 | 0.20 | 0 | 0 | 0 | 0 | 0 | 0 | 0 | 0 | 0 | 0 | 0 | 0.50 | 12.50 | 630 | 10 |
| 41 | 88 | 9.50 | 1.0 | 0.95 | 0 | 0 | 0 | 0 | 0 | 0 | 0 | 0 | 0 | 0 | 0 | 0.50 | 59.38 | 630 | 10 |
| 42 | 89 | 9.50 | 1.0 | 0 | 0.02 | 0 | 0 | 0 | 0 | 0 | 0 | 0 | 0 | 0 | 0 | 0.50 | 0.57 | 630 | 10 |
| 43 | 89 | 9.50 | 1.0 | 0 | 0.05 | 0 | 0 | 0 | 0 | 0 | 0 | 0 | 0 | 0 | 0 | 0.50 | 1.43 | 630 | 10 |
| 44 | 89 | 9.50 | 1.0 | 0 | 0.10 | 0 | 0 | 0 | 0 | 0 | 0 | 0 | 0 | 0 | 0 | 0.50 | 2.71 | 630 | 10 |
| 45 | 88 | 9.50 | 1.0 | 0 | 0.29 | 0.50 | 0 | 0 | 0 | 0 | 0 | 0 | 0 | 0 | 0 | 0.50 | 8.13 | 630 | 10 |
| 46 | 88 | 9.50 | 1.0 | 0 | 0.29 | 0 | 0.50 | 0 | 0 | 0 | 0 | 0 | 0 | 0 | 0 | 0.50 | 8.13 | 630 | 10 |
| 47 | 88 | 9.50 | 1.0 | 0 | 0.29 | 0 | 0 | 0.50 | 0 | 0 | 0 | 0 | 0 | 0 | 0 | 0.50 | 8.13 | 630 | 10 |
| 48 | 89 | 9.50 | 1.0 | 0 | 0.29 | 0 | 0 | 0 | 0.20 | 0 | 0 | 0 | 0 | 0 | 0 | 0.50 | 8.13 | 630 | 10 |
| 49 | 89 | 9.50 | 1.0 | 0 | 0.29 | 0 | 0 | 0 | 0 | 0.20 | 0 | 0 | 0 | 0 | 0 | 0.50 | 8.13 | 630 | 10 |
| 50 | 88 | 9.50 | 1.0 | 0 | 0.29 | 0 | 0 | 0 | 0 | 0 | 0.50 | 0 | 0 | 0 | 0 | 0.50 | 8.13 | 630 | 10 |

TABLE 2-continued

| | Hot-dip coating bath | | | | | | | | | | | | | | | | | | |
| | Chemical composition (mass %) | | | | | | | | | | | | | | | | (Ca + Sr)/Mg (Atomic concentration ratio) | Bath temp. (° C.) | Cooling Average cooling rate (° C./s) |
| No. | Al | Si | Mg | Ca | Sr | Mn | V | Cr | Mo | Ti | Ni | Co | Sb | Zr | B | Fe | | | |
| --- | --- | --- | --- | --- | --- | --- | --- | --- | --- | --- | --- | --- | --- | --- | --- | --- | --- | --- | --- |
| 51 | 88 | 9.50 | 1.0 | 0 | 0.29 | 0 | 0 | 0 | 0 | 0 | 0 | 0.50 | 0 | 0 | 0 | 0.50 | 8.13 | 630 | 10 |
| 52 | 89 | 9.50 | 1.0 | 0 | 0.29 | 0 | 0 | 0 | 0 | 0 | 0 | 0 | 0.20 | 0 | 0 | 0.50 | 8.13 | 630 | 10 |
| 53 | 89 | 9.50 | 1.0 | 0 | 0.29 | 0 | 0 | 0 | 0 | 0 | 0 | 0 | 0 | 0.20 | 0 | 0.50 | 8.13 | 630 | 10 |
| 54 | 89 | 9.50 | 1.0 | 0 | 0.29 | 0 | 0 | 0 | 0 | 0 | 0 | 0 | 0 | 0 | 0.10 | 0.50 | 8.13 | 630 | 10 |

TABLE 3

| | Hot-dip coating bath | | | | | | | | | | | | | | | | | | |
| | Chemical composition (mass %) | | | | | | | | | | | | | | | | (Ca + Sr)/Mg (Atomic concentration ratio) | Bath temp. (° C.) | Cooling Average cooling rate (° C./s) |
| No. | Al | Si | Mg | Ca | Sr | Mn | V | Cr | Mo | Ti | Ni | Co | Sb | Zr | B | Fe | | | |
| --- | --- | --- | --- | --- | --- | --- | --- | --- | --- | --- | --- | --- | --- | --- | --- | --- | --- | --- | --- |
| 55 | 89 | 9.50 | 1.0 | 0 | 0.29 | 0 | 0 | 0 | 0 | 0 | 0 | 0 | 0 | 0 | 0 | 0.50 | 8.13 | 630 | 10 |
| 56 | 88 | 9.50 | 1.0 | 0 | 1.00 | 0 | 0 | 0 | 0 | 0 | 0 | 0 | 0 | 0 | 0 | 0.50 | 28.53 | 630 | 10 |
| 57 | 89 | 9.50 | 1.0 | 0.05 | 0.02 | 0 | 0 | 0 | 0 | 0 | 0 | 0 | 0 | 0 | 0 | 0.50 | 3.70 | 630 | 10 |
| 58 | 89 | 9.50 | 1.0 | 0.03 | 0.06 | 0 | 0 | 0 | 0 | 0 | 0 | 0 | 0 | 0 | 0 | 0.50 | 3.59 | 630 | 10 |
| 59 | 89 | 9.50 | 1.0 | 0.01 | 0.1 | 0 | 0 | 0 | 0 | 0 | 0 | 0 | 0 | 0 | 0 | 0.50 | 3.34 | 630 | 10 |
| 60 | 87 | 9.50 | 1.0 | 1.0 | 1.0 | 0 | 0 | 0 | 0 | 0 | 0 | 0 | 0 | 0 | 0 | 0.50 | 86.48 | 630 | 10 |
| 61 | 90 | 9.50 | 0.4 | 0.1 | 0.0 | 0 | 0 | 0 | 0 | 0 | 0 | 0 | 0 | 0 | 0 | 0.50 | 15.24 | 630 | 10 |
| 62 | 90 | 9.50 | 0.0 | 0.1 | 0 | 0 | 0 | 0 | 0 | 0 | 0 | 0 | 0 | 0 | 0 | 0.50 | — | 630 | 10 |
| 63 | 89 | 9.50 | 0.0 | 1 | 0 | 0 | 0 | 0 | 0 | 0 | 0 | 0 | 0 | 0 | 0 | 0.50 | — | 630 | 10 |
| 64 | 90 | 9.50 | 0.0 | 0 | 0.19 | 0 | 0 | 0 | 0 | 0 | 0 | 0 | 0 | 0 | 0 | 0.50 | — | 630 | 10 |
| 65 | 88 | 9.50 | 0.0 | 0 | 1.9 | 0 | 0 | 0 | 0 | 0 | 0 | 0 | 0 | 0 | 0 | 0.50 | — | 630 | 10 |
| 66 | 81 | 10.50 | 8.0 | 0.1 | 0 | 0 | 0 | 0 | 0 | 0 | 0 | 0 | 0 | 0 | 0 | 0.50 | 0.78 | 630 | 10 |
| 67 | 85 | 8.40 | 6.0 | 0.1 | 0 | 0 | 0 | 0 | 0 | 0 | 0 | 0 | 0 | 0 | 0 | 0.50 | 1.04 | 630 | 10 |
| 68 | 91 | 7.50 | 1.0 | 0.05 | 0 | 0 | 0 | 0 | 0 | 0 | 0 | 0 | 0 | 0 | 0 | 0.50 | 3.13 | 630 | 10 |
| 69 | 94 | 4.00 | 1.0 | 0.05 | 0 | 0 | 0 | 0 | 0 | 0 | 0 | 0 | 0 | 0 | 0 | 0.50 | 3.13 | 630 | 10 |
| 70 | 97 | 1.52 | 1.0 | 0.05 | 0 | 0 | 0 | 0 | 0 | 0 | 0 | 0 | 0 | 0 | 0 | 0.50 | 3.13 | 630 | 10 |
| 71 | 85 | 13.00 | 1.0 | 0.05 | 0 | 0 | 0 | 0 | 0 | 0 | 0 | 0 | 0 | 0 | 0 | 0.50 | 3.13 | 630 | 10 |
| 72 | 88 | 10.70 | 1.0 | 0.05 | 0 | 0 | 0 | 0 | 0 | 0 | 0 | 0 | 0 | 0 | 0 | 0.50 | 3.13 | 630 | 10 |
| 73 | 88 | 10.70 | 1.0 | 0.05 | 0 | 0 | 0 | 0 | 0 | 0 | 0 | 0 | 0 | 0 | 0 | 0.50 | 3.13 | 630 | 10 |
| 74 | 87 | 10.70 | 1.0 | 0.05 | 0 | 0 | 0 | 0 | 0 | 0 | 0 | 0 | 0 | 0 | 0 | 1.50 | 3.13 | 630 | 10 |
| 75 | 86 | 10.70 | 1.0 | 0.05 | 0 | 0 | 0 | 0 | 0 | 0 | 0 | 0 | 0 | 0 | 0 | 2.50 | 3.13 | 630 | 10 |
| 76 | 85 | 10.70 | 1.0 | 0.05 | 0 | 0 | 0 | 0 | 0 | 0 | 0 | 0 | 0 | 0 | 0 | 3.50 | 3.13 | 630 | 10 |
| 77 | 88 | 10.70 | 1.0 | 0.05 | 0 | 0 | 0 | 0 | 0 | 0 | 0 | 0 | 0 | 0 | 0 | 0.50 | 3.13 | 630 | 10 |
| 78 | 88 | 10.70 | 1.0 | 0.05 | 0 | 0 | 0 | 0 | 0 | 0 | 0 | 0 | 0 | 0 | 0 | 0.50 | 3.13 | 630 | 10 |
| 79 | 83 | 10.70 | 1.0 | 0.05 | 0 | 0 | 0 | 0 | 0 | 0 | 0 | 0 | 0 | 0 | 0 | 5.50 | 3.13 | 630 | 10 |
| 80 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 81 | 89 | 9.50 | 1.0 | 0.05 | 0 | 0 | 0 | 0 | 0 | 0 | 0 | 0 | 0 | 0 | 0 | 0.50 | 3.13 | 630 | 10 |
| 82 | 89 | 9.50 | 1.0 | 0.05 | 0 | 0 | 0 | 0 | 0 | 0 | 0 | 0 | 0 | 0 | 0 | 0.50 | 3.13 | 630 | 10 |

TABLE 4

| | Coated steel sheet Chemical composition of coated layer (mass %) | | | | | | | | | | | | |
| No. | Al | Si | Mg | Ca | Sr | Mn | V | Cr | Mo | Ti | Ni | Co | Sb |
| --- | --- | --- | --- | --- | --- | --- | --- | --- | --- | --- | --- | --- | --- |
| 1 | 86 | 9.0 | 0.00 | 0.00 | 0.00 | 0 | 0 | 0 | 0 | 0 | 0 | 0 | 0 |
| 2 | 85 | 9.0 | 0.20 | 0.00 | 0.00 | 0 | 0 | 0 | 0 | 0 | 0 | 0 | 0 |
| 3 | 85 | 9.0 | 0.49 | 0.00 | 0.00 | 0 | 0 | 0 | 0 | 0 | 0 | 0 | 0 |
| 4 | 85 | 9.0 | 1.00 | 0.00 | 0.00 | 0 | 0 | 0 | 0 | 0 | 0 | 0 | 0 |
| 5 | 84 | 9.0 | 2.00 | 0.00 | 0.00 | 0 | 0 | 0 | 0 | 0 | 0 | 0 | 0 |
| 6 | 85 | 9.0 | 1.00 | 0.01 | 0.00 | 0 | 0 | 0 | 0 | 0 | 0 | 0 | 0 |
| 7 | 85 | 9.0 | 1.00 | 0.02 | 0.00 | 0 | 0 | 0 | 0 | 0 | 0 | 0 | 0 |
| 8 | 85 | 9.0 | 1.00 | 0.05 | 0.00 | 0 | 0 | 0 | 0 | 0 | 0 | 0 | 0 |
| 9 | 85 | 9.0 | 1.00 | 0.05 | 0.00 | 0 | 0 | 0 | 0 | 0 | 0 | 0 | 0 |
| 10 | 84 | 9.0 | 1.00 | 0.05 | 0.00 | 0.50 | 0 | 0 | 0 | 0 | 0 | 0 | 0 |

TABLE 4-continued

| No. | Al | Si | Mg | Ca | Sr | Mn | V | Cr | Mo | Ti | Ni | Co | Sb |
|---|---|---|---|---|---|---|---|---|---|---|---|---|---|
| 11 | 84 | 9.0 | 1.00 | 0.05 | 0.00 | 0 | 0.50 | 0 | 0 | 0 | 0 | 0 | 0 |
| 12 | 84 | 9.0 | 1.00 | 0.05 | 0.00 | 0 | 0 | 0.50 | 0 | 0 | 0 | 0 | 0 |
| 13 | 84 | 9.0 | 1.00 | 0.05 | 0.00 | 0 | 0 | 0 | 0.20 | 0 | 0 | 0 | 0 |
| 14 | 84 | 9.0 | 1.00 | 0.05 | 0.00 | 0 | 0 | 0 | 0 | 0.20 | 0 | 0 | 0 |
| 15 | 84 | 9.0 | 1.00 | 0.05 | 0.00 | 0 | 0 | 0 | 0 | 0 | 0.50 | 0 | 0 |
| 16 | 84 | 9.0 | 1.00 | 0.05 | 0.00 | 0 | 0 | 0 | 0 | 0 | 0 | 0.50 | 0 |
| 17 | 84 | 9.0 | 1.00 | 0.05 | 0.00 | 0 | 0 | 0 | 0 | 0 | 0 | 0 | 0.20 |
| 18 | 84 | 9.0 | 1.00 | 0.05 | 0.00 | 0 | 0 | 0 | 0 | 0 | 0 | 0 | 0 |
| 19 | 84 | 9.0 | 1.00 | 0.05 | 0.00 | 0 | 0 | 0 | 0 | 0 | 0 | 0 | 0 |
| 20 | 85 | 9.0 | 1.00 | 0.05 | 0.00 | 0 | 0 | 0 | 0 | 0 | 0 | 0 | 0 |
| 21 | 85 | 9.0 | 1.00 | 0.05 | 0.00 | 0 | 0 | 0 | 0 | 0 | 0 | 0 | 0 |
| 22 | 85 | 9.0 | 1.00 | 0.05 | 0.00 | 0 | 0 | 0 | 0 | 0 | 0 | 0 | 0 |
| 23 | 85 | 9.0 | 1.00 | 0.05 | 0.00 | 0 | 0 | 0 | 0 | 0 | 0 | 0 | 0 |
| 24 | 85 | 9.0 | 0.57 | 0.05 | 0.00 | 0 | 0 | 0 | 0 | 0 | 0 | 0 | 0 |
| 25 | 85 | 9.0 | 0.70 | 0.05 | 0.00 | 0 | 0 | 0 | 0 | 0 | 0 | 0 | 0 |
| 26 | 84 | 9.0 | 1.80 | 0.05 | 0.00 | 0 | 0 | 0 | 0 | 0 | 0 | 0 | 0 |
| 27 | 84 | 9.0 | 1.80 | 0.05 | 0.00 | 0 | 0 | 0 | 0 | 0 | 0 | 0 | 0 |

| | Coated steel sheet | | | | | | |
|---|---|---|---|---|---|---|---|
| | Chemical composition of coated layer (mass %) | | | | Average thickness of coated layer (μm) | Mg solute concentration in Al phase (mass %) | |
| No. | Zr | B | (Ca + Sr)/Mg (Atomic concentration ratio) | Fe | | | Remarks |
| 1 | 0 | 0 | — | 5 | 20 | 0 | Comparative Example |
| 2 | 0 | 0 | 0.00 | 5 | 20 | 0.2 | Comparative Example |
| 3 | 0 | 0 | 0.00 | 5 | 20 | 0.4 | Comparative Example |
| 4 | 0 | 0 | 0.00 | 5 | 20 | 0.8 | Comparative Example |
| 5 | 0 | 0 | 0.00 | 5 | 20 | 1.2 | Comparative Example |
| 6 | 0 | 0 | 0.66 | 5 | 20 | 0.9 | Comparative Example |
| 7 | 0 | 0 | 1.32 | 5 | 20 | 0.6 | Example |
| 8 | 0 | 0 | 3.29 | 5 | 20 | 0.3 | Example |
| 9 | 0 | 0 | 3.29 | 5 | 20 | 0.5 | Example |
| 10 | 0 | 0 | 3.29 | 5 | 20 | 0.5 | Example |
| 11 | 0 | 0 | 3.29 | 5 | 20 | 0.5 | Example |
| 12 | 0 | 0 | 3.29 | 5 | 20 | 0.5 | Example |
| 13 | 0 | 0 | 3.29 | 5 | 20 | 0.5 | Example |
| 14 | 0 | 0 | 3.29 | 5 | 20 | 0.5 | Example |
| 15 | 0 | 0 | 3.29 | 5 | 20 | 0.5 | Example |
| 16 | 0 | 0 | 3.29 | 5 | 20 | 0.5 | Example |
| 17 | 0 | 0 | 3.29 | 5 | 20 | 0.5 | Example |
| 18 | 0.20 | 0 | 3.29 | 5 | 20 | 0.5 | Example |
| 19 | 0 | 0.10 | 3.29 | 5 | 20 | 0.5 | Example |
| 20 | 0 | 0 | 3.29 | 5 | 8 | 0.5 | Comparative Example |
| 21 | 0 | 0 | 3.29 | 5 | 15 | 0.5 | Example |
| 22 | 0 | 0 | 3.29 | 5 | 25 | 0.5 | Example |
| 23 | 0 | 0 | 3.29 | 5 | 35 | 0.5 | Comparative Example |
| 24 | 0 | 0 | 5.79 | 5 | 20 | 0.5 | Example |
| 25 | 0 | 0 | 4.70 | 5 | 20 | 0.5 | Example |
| 26 | 0 | 0 | 1.83 | 5 | 20 | 0.5 | Example |
| 27 | 0 | 0 | 1.83 | 5 | 20 | 0.5 | Example |

TABLE 5

| | Coated steel sheet Chemical composition of coated layer (mass %) | | | | | | | | | | | | |
|---|---|---|---|---|---|---|---|---|---|---|---|---|---|
| No. | Al | Si | Mg | Ca | Sr | Mn | V | Cr | Mo | Ti | Ni | Co | Sb |
| 28 | 84 | 9.0 | 1.89 | 0.05 | 0.00 | 0 | 0 | 0 | 0 | 0 | 0 | 0 | 0 |
| 29 | 84 | 9.0 | 2.05 | 0.05 | 0.00 | 0 | 0 | 0 | 0 | 0 | 0 | 0 | 0 |
| 30 | 82 | 9.0 | 4.00 | 0.05 | 0.00 | 0 | 0 | 0 | 0 | 0 | 0 | 0 | 0 |
| 31 | 85 | 9.0 | 1.00 | 0.05 | 0.00 | 0 | 0 | 0 | 0 | 0 | 0 | 0 | 0 |
| 32 | 85 | 9.0 | 1.00 | 0.05 | 0.00 | 0 | 0 | 0 | 0 | 0 | 0 | 0 | 0 |

TABLE 5-continued

| No. | | | | | | | | | | | | | |
|---|---|---|---|---|---|---|---|---|---|---|---|---|---|
| 33 | 85 | 9.0 | 1.00 | 0.05 | 0.00 | 0 | 0 | 0 | 0 | 0 | 0 | 0 | 0 |
| 34 | 85 | 9.0 | 1.00 | 0.05 | 0.00 | 0 | 0 | 0 | 0 | 0 | 0 | 0 | 0 |
| 35 | 85 | 9.0 | 1.00 | 0.05 | 0.00 | 0 | 0 | 0 | 0 | 0 | 0 | 0 | 0 |
| 36 | 85 | 9.0 | 1.00 | 0.05 | 0.00 | 0 | 0 | 0 | 0 | 0 | 0 | 0 | 0 |
| 37 | 85 | 9.0 | 1.00 | 0.01 | 0.00 | 0 | 0 | 0 | 0 | 0 | 0 | 0 | 0 |
| 38 | 85 | 9.0 | 1.00 | 0.02 | 0.00 | 0 | 0 | 0 | 0 | 0 | 0 | 0 | 0 |
| 39 | 84 | 9.0 | 1.00 | 0.16 | 0.00 | 0 | 0 | 0 | 0 | 0 | 0 | 0 | 0 |
| 40 | 84 | 9.0 | 1.00 | 0.21 | 0.00 | 0 | 0 | 0 | 0 | 0 | 0 | 0 | 0 |
| 41 | 84 | 9.0 | 1.00 | 1.00 | 0.00 | 0 | 0 | 0 | 0 | 0 | 0 | 0 | 0 |
| 42 | 85 | 9.0 | 1.00 | 0.00 | 0.02 | 0 | 0 | 0 | 0 | 0 | 0 | 0 | 0 |
| 43 | 85 | 9.0 | 1.00 | 0.00 | 0.05 | 0 | 0 | 0 | 0 | 0 | 0 | 0 | 0 |
| 44 | 84 | 9.0 | 1.00 | 0.00 | 0.10 | 0 | 0 | 0 | 0 | 0 | 0 | 0 | 0 |
| 45 | 84 | 9.0 | 1.00 | 0.00 | 0.30 | 0.50 | 0 | 0 | 0 | 0 | 0 | 0 | 0 |
| 46 | 84 | 9.0 | 1.00 | 0.00 | 0.30 | 0 | 0.50 | 0 | 0 | 0 | 0 | 0 | 0 |
| 47 | 84 | 9.0 | 1.00 | 0.00 | 0.30 | 0 | 0 | 0.50 | 0 | 0 | 0 | 0 | 0 |
| 48 | 84 | 9.0 | 1.00 | 0.00 | 0.30 | 0 | 0 | 0 | 0.20 | 0 | 0 | 0 | 0 |
| 49 | 84 | 9.0 | 1.00 | 0.00 | 0.30 | 0 | 0 | 0 | 0 | 0.20 | 0 | 0 | 0 |
| 50 | 84 | 9.0 | 1.00 | 0.00 | 0.30 | 0 | 0 | 0 | 0 | 0 | 0.50 | 0 | 0 |
| 51 | 84 | 9.0 | 1.00 | 0.00 | 0.30 | 0 | 0 | 0 | 0 | 0 | 0 | 0.50 | 0 |
| 52 | 84 | 9.0 | 1.00 | 0.00 | 0.30 | 0 | 0 | 0 | 0 | 0 | 0 | 0 | 0.20 |
| 53 | 84 | 9.0 | 1.00 | 0.00 | 0.30 | 0 | 0 | 0 | 0 | 0 | 0 | 0 | 0 |
| 54 | 84 | 9.0 | 1.00 | 0.00 | 0.30 | 0 | 0 | 0 | 0 | 0 | 0 | 0 | 0 |

| | Coated steel sheet | | | | | |
|---|---|---|---|---|---|---|
| | Chemical composition of coated layer (mass %) | | | | Average thickness of coated layer (μm) | Mg solute concentration in Al phase (mass %) |
| No. | Zr | B | (Ca + Sr)/Mg (Atomic concentration ratio) | Fe | | | Remarks |
| 28 | 0 | 0 | 1.74 | 5 | 20 | 0.5 | Example |
| 29 | 0 | 0 | 1.60 | 5 | 20 | 0.5 | Comparative Example |
| 30 | 0 | 0 | 0.82 | 5 | 20 | 0.5 | Comparative Example |
| 31 | 0 | 0 | 3.29 | 5 | 20 | 0.5 | Example |
| 32 | 0 | 0 | 3.29 | 5 | 20 | 0.5 | Example |
| 33 | 0 | 0 | 3.29 | 5 | 20 | 0.5 | Example |
| 34 | 0 | 0 | 3.29 | 5 | 20 | 0.5 | Comparative Example |
| 35 | 0 | 0 | 3.29 | 5 | 20 | 0.7 | Example |
| 36 | 0 | 0 | 3.29 | 5 | 20 | 2 | Comparative Example |
| 37 | 0 | 0 | 0.86 | 5 | 20 | 0.5 | Comparative Example |
| 38 | 0 | 0 | 0.99 | 5 | 20 | 0.5 | Comparative Example |
| 39 | 0 | 0 | 9.87 | 5 | 20 | 0.5 | Example |
| 40 | 0 | 0 | 13.16 | 5 | 20 | 0.5 | Comparative Example |
| 41 | 0 | 0 | 62.50 | 5 | 20 | 0.5 | Comparative Example |
| 42 | 0 | 0 | 0.60 | 5 | 20 | 0.6 | Comparative Example |
| 43 | 0 | 0 | 1.50 | 5 | 20 | 0.6 | Example |
| 44 | 0 | 0 | 2.85 | 5 | 20 | 0.5 | Example |
| 45 | 0 | 0 | 8.56 | 5 | 20 | 0.5 | Example |
| 46 | 0 | 0 | 8.56 | 5 | 20 | 0.5 | Example |
| 47 | 0 | 0 | 8.56 | 5 | 20 | 0.5 | Example |
| 48 | 0 | 0 | 8.56 | 5 | 20 | 0.5 | Example |
| 49 | 0 | 0 | 8.56 | 5 | 20 | 0.5 | Example |
| 50 | 0 | 0 | 8.56 | 5 | 20 | 0.5 | Example |
| 51 | 0 | 0 | 8.56 | 5 | 20 | 0.5 | Example |
| 52 | 0 | 0 | 8.56 | 5 | 20 | 0.5 | Example |
| 53 | 0.20 | 0 | 8.56 | 5 | 20 | 0.5 | Example |
| 54 | 0 | 0.10 | 8.56 | 5 | 20 | 0.5 | Example |

TABLE 6

| | Coated steel sheet | | | | | | | | | | | | | | | | | | | |
| | Chemical composition of coated layer (mass %) | | | | | | | | | | | | | | | (Ca + Sr)/Mg (Atomic concentration ratio) | Fe | Average thickness of coated layer (μm) | Mg solute concentration in Al phase (mass %) | Remarks |
| No. | Al | Si | Mg | Ca | Sr | Mn | V | Cr | Mo | Ti | Ni | Co | Sb | Zr | B | | | | | |
|---|---|---|---|---|---|---|---|---|---|---|---|---|---|---|---|---|---|---|---|---|
| 55 | 84 | 9.0 | 1.00 | 0.00 | 0.30 | 0 | 0 | 0 | 0 | 0 | 0 | 0 | 0 | 0 | 0 | 8.56 | 5 | 20 | 0.5 | Example |
| 56 | 84 | 9.0 | 1.00 | 0.00 | 1.05 | 0 | 0 | 0 | 0 | 0 | 0 | 0 | 0 | 0 | 0 | 30.03 | 5 | 20 | 0.5 | Comparative Example |
| 57 | 84 | 9.0 | 1.00 | 0.05 | 0.02 | 0 | 0 | 0 | 0 | 0 | 0 | 0 | 0 | 0 | 0 | 3.89 | 5 | 20 | 0.5 | Example |
| 58 | 84 | 9.0 | 1.00 | 0.03 | 0.06 | 0 | 0 | 0 | 0 | 0 | 0 | 0 | 0 | 0 | 0 | 3.78 | 5 | 20 | 0.5 | Example |
| 59 | 84 | 9.0 | 1.00 | 0.01 | 0.10 | 0 | 0 | 0 | 0 | 0 | 0 | 0 | 0 | 0 | 0 | 3.51 | 5 | 20 | 0.5 | Example |
| 60 | 83 | 9.0 | 1.00 | 1.00 | 1.00 | 0 | 0 | 0 | 0 | 0 | 0 | 0 | 0 | 0 | 0 | 91.03 | 5 | 20 | 0.5 | Comparative Example |
| 61 | 85 | 9.0 | 0.39 | 0.10 | 0.00 | 0 | 0 | 0 | 0 | 0 | 0 | 0 | 0 | 0 | 0 | 16.05 | 5 | 20 | 0.5 | Comparative Example |
| 62 | 85 | 9.0 | 0.00 | 0.10 | 0.00 | 0 | 0 | 0 | 0 | 0 | 0 | 0 | 0 | 0 | 0 | — | 5 | 20 | 0.5 | Comparative Example |
| 63 | 85 | 9.0 | 0.00 | 1.05 | 0.00 | 0 | 0 | 0 | 0 | 0 | 0 | 0 | 0 | 0 | 0 | — | 5 | 20 | 0.5 | Comparative Example |
| 64 | 85 | 9.0 | 0.00 | 0.00 | 0.20 | 0 | 0 | 0 | 0 | 0 | 0 | 0 | 0 | 0 | 0 | — | 5 | 20 | 0.5 | Comparative Example |
| 65 | 84 | 9.0 | 0.00 | 0.00 | 2.00 | 0 | 0 | 0 | 0 | 0 | 0 | 0 | 0 | 0 | 0 | — | 5 | 20 | 0.5 | Comparative Example |
| 66 | 77 | 10.0 | 8.00 | 0.11 | 0.00 | 0 | 0 | 0 | 0 | 0 | 0 | 0 | 0 | 0 | 0 | 0.82 | 5 | 20 | 0.5 | Comparative Example |
| 67 | 81 | 8.0 | 6.00 | 0.11 | 0.00 | 0 | 0 | 0 | 0 | 0 | 0 | 0 | 0 | 0 | 0 | 1.10 | 5 | 20 | 0.5 | Comparative Example |
| 68 | 86 | 7.1 | 1.00 | 0.05 | 0.00 | 0 | 0 | 0 | 0 | 0 | 0 | 0 | 0 | 0 | 0 | 3.29 | 5 | 20 | 0.5 | Example |
| 69 | 90 | 3.8 | 1.00 | 0.05 | 0.00 | 0 | 0 | 0 | 0 | 0 | 0 | 0 | 0 | 0 | 0 | 3.29 | 5 | 20 | 0.5 | Comparative Example |
| 70 | 92 | 1.4 | 1.00 | 0.05 | 0.00 | 0 | 0 | 0 | 0 | 0 | 0 | 0 | 0 | 0 | 0 | 3.29 | 5 | 20 | 0.5 | Comparative Example |
| 71 | 81 | 12.4 | 1.00 | 0.05 | 0.00 | 0 | 0 | 0 | 0 | 0 | 0 | 0 | 0 | 0 | 0 | 3.29 | 5 | 20 | 0.5 | Comparative Example |
| 72 | 79 | 9.6 | 1.00 | 0.06 | 0.00 | 0 | 0 | 0 | 0 | 0 | 0 | 0 | 0 | 0 | 0 | 3.47 | 10 | 20 | 0.5 | Example |
| 73 | 70 | 8.6 | 1.00 | 0.06 | 0.00 | 0 | 0 | 0 | 0 | 0 | 0 | 0 | 0 | 0 | 0 | 3.91 | 20 | 20 | 0.5 | Example |
| 74 | 68 | 8.3 | 1.00 | 0.06 | 0.00 | 0 | 0 | 0 | 0 | 0 | 0 | 0 | 0 | 0 | 0 | 4.01 | 22 | 20 | 0.5 | Example |
| 75 | 64 | 8.0 | 1.00 | 0.07 | 0.00 | 0 | 0 | 0 | 0 | 0 | 0 | 0 | 0 | 0 | 0 | 4.17 | 25 | 20 | 0.5 | Example |
| 76 | 61 | 7.7 | 1.00 | 0.07 | 0.00 | 0 | 0 | 0 | 0 | 0 | 0 | 0 | 0 | 0 | 0 | 4.34 | 28 | 20 | 0.5 | Example |
| 77 | 63 | 7.7 | 1.00 | 0.07 | 0.00 | 0 | 0 | 0 | 0 | 0 | 0 | 0 | 0 | 0 | 0 | 4.34 | 28 | 20 | 0.5 | Example |
| 78 | 60 | 7.3 | 1.00 | 0.07 | 0.00 | 0 | 0 | 0 | 0 | 0 | 0 | 0 | 0 | 0 | 0 | 4.60 | 32 | 20 | 0.5 | Comparative Example |
| 79 | 55 | 7.2 | 1.00 | 0.07 | 0.00 | 0 | 0 | 0 | 0 | 0 | 0 | 0 | 0 | 0 | 0 | 4.66 | 33 | 20 | 0.5 | Comparative Example |
| 80 | 85 | 9.0 | 1.00 | 0.05 | 0.00 | 0 | 0 | 0 | 0 | 0 | 0 | 0 | 0 | 0 | 0 | 3.29 | 5 | 20 | 0.5 | Example |
| 81 | 85 | 9.0 | 1.00 | 0.05 | 0.00 | 0 | 0 | 0 | 0 | 0 | 0 | 0 | 0 | 0 | 0 | 3.29 | 5 | 20 | 0.5 | Example |
| 82 | 85 | 9.0 | 1.00 | 0.05 | 0.00 | 0 | 0 | 0 | 0 | 0 | 0 | 0 | 0 | 0 | 0 | 3.29 | 5 | 20 | 0.5 | Comparative Example |

TABLE 7

| | Production conditions | | Hot pressed member | | | | Evaluation result | | |
| | Heating | | Al—Fe intermetallic compound layer | Al—Fe—Si intermetallic compound phase | Composition of oxide coating layer | Diffusible hydrogen content (mass ppm) | Post- | | |
| No. | Heating temp. (°C.) | Holding time (s) | | | | | Hydrogen embrittlement property | coating corrosion resistance | Remarks |
|---|---|---|---|---|---|---|---|---|---|
| 1 | 910 | 60 | ○ | ○ | Al | 0.60 | 4 | 1 | Comparative Example |
| 2 | 910 | 60 | ○ | ○ | Mg | 0.35 | 3 | 1 | Comparative Example |
| 3 | 910 | 60 | ○ | ○ | Mg | 0.32 | 3 | 1 | Comparative Example |
| 4 | 910 | 60 | ○ | ○ | Mg | 0.30 | 3 | 1 | Comparative Example |
| 5 | 910 | 60 | ○ | ○ | Mg | 0.35 | 3 | 1 | Comparative Example |

TABLE 7-continued

| | Production conditions | | Hot pressed member | | | | Evaluation result | | |
| | Heating | | Al—Fe | Al—Fe—Si | Composition | Diffusible | | Post- | | |
| No. | Heating temp. (° C.) | Holding time (s) | intermetallic compound layer | intermetallic compound phase | of oxide coating layer | hydrogen content (mass ppm) | Hydrogen embrittlement property | coating corrosion resistance | Remarks |
|---|---|---|---|---|---|---|---|---|---|
| 6 | 910 | 60 | ○ | ○ | Mg, Ca | 0.28 | 3 | 1 | Comparative Example |
| 7 | 910 | 60 | ○ | ○ | Mg, Ca | 0.21 | 2 | 1 | Example |
| 8 | 910 | 60 | ○ | ○ | Mg, Ca | 0.15 | 1 | 1 | Example |
| 9 | 910 | 60 | ○ | ○ | Mg, Ca | 0.15 | 1 | 1 | Example |
| 10 | 910 | 60 | ○ | ○ | Mg, Ca | 0.15 | 1 | 1 | Example |
| 11 | 910 | 60 | ○ | ○ | Mg, Ca | 0.15 | 1 | 1 | Example |
| 12 | 910 | 60 | ○ | ○ | Mg, Ca | 0.15 | 1 | 1 | Example |
| 13 | 910 | 60 | ○ | ○ | Mg, Ca | 0.15 | 1 | 1 | Example |
| 14 | 910 | 60 | ○ | ○ | Mg, Ca | 0.15 | 1 | 1 | Example |
| 15 | 910 | 60 | ○ | ○ | Mg, Ca | 0.15 | 1 | 1 | Example |
| 16 | 910 | 60 | ○ | ○ | Mg, Ca | 0.15 | 1 | 1 | Example |
| 17 | 910 | 60 | ○ | ○ | Mg, Ca | 0.15 | 1 | 1 | Example |
| 18 | 910 | 60 | ○ | ○ | Mg, Ca | 0.15 | 1 | 1 | Example |
| 19 | 910 | 60 | ○ | ○ | Mg, Ca | 0.15 | 1 | 1 | Example |
| 20 | 910 | 60 | ○ | ○ | Mg, Ca | 0.15 | 1 | 4 | Comparative Example |
| 21 | 910 | 60 | ○ | ○ | Mg, Ca | 0.15 | 1 | 1 | Example |
| 22 | 910 | 60 | ○ | ○ | Mg, Ca | 0.18 | 1 | 1 | Example |
| 23 | 910 | 60 | ○ | ○ | Mg, Ca | 0.27 | 3 | 1 | Comparative Example |
| 24 | 910 | 60 | ○ | ○ | Mg, Ca | 0.26 | 3 | 1 | Example |
| 25 | 910 | 60 | ○ | ○ | Mg, Ca | 0.20 | 1 | 1 | Example |
| 26 | 910 | 60 | ○ | ○ | Mg, Ca | 0.22 | 1 | 1 | Example |
| 27 | 910 | 60 | ○ | ○ | Mg, Ca | 0.18 | 1 | 1 | Example |

TABLE 8

| | Production conditions | | Hot pressed member | | | | Evaluation result | | |
| | Heating | | Al—Fe | Al—Fe—Si | Composition | Diffusible | | Post- | | |
| No. | Heating temp. (° C.) | Holding time (s) | intermetallic compound layer | intermetallic compound phase | of oxide coating layer | hydrogen content (mass ppm) | Hydrogen embrittlement property | coating corrosion resistance | Remarks |
|---|---|---|---|---|---|---|---|---|---|
| 28 | 910 | 60 | ○ | ○ | Mg, Ca | 0.24 | 2 | 1 | Example |
| 29 | 910 | 60 | ○ | ○ | Mg, Ca | 0.25 | 3 | 1 | Comparative Example |
| 30 | 910 | 60 | ○ | ○ | Mg, Ca | 0.48 | 3 | 1 | Comparative Example |
| 31 | 910 | 0 | ○ | ○ | Mg, Ca | 0.12 | 1 | 1 | Example |
| 32 | 910 | 30 | ○ | ○ | Mg, Ca | 0.13 | 1 | 1 | Example |
| 33 | 910 | 240 | ○ | ○ | Mg, Ca | 0.20 | 1 | 1 | Example |
| 34 | 910 | 600 | ○ | ○ | Mg, Ca | 0.28 | 3 | 1 | Comparative Example |
| 35 | 910 | 60 | ○ | ○ | Mg, Ca | 0.18 | 1 | 1 | Example |
| 36 | 910 | 60 | ○ | ○ | Mg, Ca | 0.30 | 3 | 1 | Comparative Example |
| 37 | 910 | 60 | ○ | ○ | Mg, Ca | 0.27 | 3 | 1 | Comparative Example |
| 38 | 910 | 60 | ○ | ○ | Mg, Ca | 0.24 | 2 | 1 | Comparative Example |
| 39 | 910 | 60 | ○ | ○ | Mg, Ca | 0.22 | 2 | 1 | Example |
| 40 | 910 | 60 | ○ | ○ | Mg, Ca | 0.26 | 3 | 1 | Comparative Example |
| 41 | 910 | 60 | ○ | ○ | Ca | 0.40 | 3 | 1 | Comparative Example |
| 42 | 910 | 60 | ○ | ○ | Mg, Sr | 0.26 | 3 | 1 | Comparative Example |
| 43 | 910 | 60 | ○ | ○ | Mg, Sr | 0.23 | 2 | 1 | Example |
| 44 | 910 | 60 | ○ | ○ | Mg, Sr | 0.15 | 1 | 1 | Example |
| 45 | 910 | 60 | ○ | ○ | Mg, Sr | 0.15 | 1 | 1 | Example |
| 46 | 910 | 60 | ○ | ○ | Mg, Sr | 0.15 | 1 | 1 | Example |
| 47 | 910 | 60 | ○ | ○ | Mg, Sr | 0.15 | 1 | 1 | Example |
| 48 | 910 | 60 | ○ | ○ | Mg, Sr | 0.15 | 1 | 1 | Example |
| 49 | 910 | 60 | ○ | ○ | Mg, Sr | 0.15 | 1 | 1 | Example |
| 50 | 910 | 60 | ○ | ○ | Mg, Sr | 0.15 | 1 | 1 | Example |

TABLE 8-continued

| | Production conditions | | Hot pressed member | | | | Evaluation result | | |
| | Heating | | Al—Fe | Al—Fe—Si | Composition | Diffusible | | Post- | |
| No. | Heating temp. (° C.) | Holding time (s) | intermetallic compound layer | intermetallic compound phase | of oxide coating layer | hydrogen content (mass ppm) | Hydrogen embrittlement property | coating corrosion resistance | Remarks |
|---|---|---|---|---|---|---|---|---|---|
| 51 | 910 | 60 | ○ | ○ | Mg, Sr | 0.15 | 1 | 1 | Example |
| 52 | 910 | 60 | ○ | ○ | Mg, Sr | 0.15 | 1 | 1 | Example |
| 53 | 910 | 60 | ○ | ○ | Mg, Sr | 0.15 | 1 | 1 | Example |
| 54 | 910 | 60 | ○ | ○ | Mg, Sr | 0.15 | 1 | 1 | Example |

TABLE 9

| | Production conditions | | Hot pressed member | | | | Evaluation result | | |
| | Heating | | Al—Fe | Al—Fe—Si | Composition | Diffusible | | Post- | |
| No. | Heating temp. (° C.) | Holding time (s) | intermetallic compound layer | intermetallic compound phase | of oxide coating layer | hydrogen content (mass ppm) | Hydrogen embrittlement property | coating corrosion resistance | Remarks |
|---|---|---|---|---|---|---|---|---|---|
| 55 | 910 | 60 | ○ | ○ | Mg, Sr | 0.22 | 1 | 1 | Example |
| 56 | 910 | 60 | ○ | ○ | Mg, Sr | 0.29 | 3 | 1 | Comparative Example |
| 57 | 910 | 60 | ○ | ○ | Mg, Ca, Sr | 0.15 | 1 | 1 | Example |
| 58 | 910 | 60 | ○ | ○ | Mg, Ca, Sr | 0.15 | 1 | 1 | Example |
| 59 | 910 | 60 | ○ | ○ | Mg, Ca, Sr | 0.15 | 1 | 1 | Example |
| 60 | 910 | 60 | ○ | ○ | Mg, Ca, Sr | 0.46 | 3 | 1 | Comparative Example |
| 61 | 910 | 60 | ○ | ○ | Mg, Ca | 0.31 | 3 | 1 | Comparative Example |
| 62 | 910 | 60 | ○ | ○ | Ca | 0.60 | 4 | 1 | Comparative Example |
| 63 | 910 | 60 | ○ | ○ | Ca | 0.80 | 4 | 1 | Comparative Example |
| 64 | 910 | 60 | ○ | ○ | Sr | 0.60 | 4 | 1 | Comparative Example |
| 65 | 910 | 60 | ○ | ○ | Sr | 0.80 | 4 | 1 | Comparative Example |
| 66 | 910 | 60 | ○ | ○ | Mg | 1.20 | 4 | 3 | Comparative Example |
| 67 | 910 | 60 | ○ | ○ | Mg | 1.00 | 4 | 1 | Comparative Example |
| 68 | 910 | 60 | ○ | ○ | Mg, Ca | 0.15 | 1 | 1 | Example |
| 69 | 910 | 60 | ○ | X | Mg, Ca | 0.15 | 1 | 3 | Comparative Example |
| 70 | 910 | 60 | ○ | X | Mg, Ca | 0.15 | 1 | 3 | Comparative Example |
| 71 | 910 | 60 | ○ | X | Mg, Ca | 0.15 | 1 | 3 | Comparative Example |
| 72 | 910 | 60 | ○ | ○ | Mg, Ca | 0.15 | 1 | 1 | Example |
| 73 | 910 | 60 | ○ | ○ | Mg, Ca | 0.15 | 1 | 1 | Example |
| 74 | 910 | 60 | ○ | ○ | Mg, Ca | 0.17 | 1 | 1 | Example |
| 75 | 910 | 60 | ○ | ○ | Mg, Ca | 0.19 | 1 | 1 | Example |
| 76 | 910 | 60 | ○ | ○ | Mg, Ca | 0.22 | 2 | 1 | Example |
| 77 | 910 | 60 | ○ | ○ | Mg, Ca | 0.24 | 2 | 1 | Example |
| 78 | 910 | 60 | ○ | ○ | Mg, Ca | 0.29 | 3 | 1 | Comparative Example |
| 79 | 910 | 60 | ○ | ○ | Mg, Ca | 0.30 | 3 | 1 | Comparative Example |
| 80 | 950 | 60 | ○ | ○ | Mg, Ca | 0.18 | 1 | 1 | Example |
| 81 | 990 | 60 | ○ | ○ | Mg, Ca | 0.23 | 2 | 1 | Example |
| 82 | 1005 | 60 | ○ | ○ | Mg, Ca | 0.27 | 3 | 1 | Comparative Example |

The invention claimed is:

1. A steel sheet for hot press forming, comprising a base steel sheet and a coated layer on both sides of the base steel sheet, wherein the coated layer comprises a chemical composition containing Si: 7 mass % to 11 mass %, Mg: 0.6 mass % to 1.9 mass %, one or both of Ca and Sr: in total, 1.0% to 10% of Mg in atomic concentration, and Fe: 0 mass % to 30 mass %, with the balance being Al and inevitable impurity, wherein concentration of Mg solute in Al phase in the coated layer is less than 1 mass %, and average thickness of the coated layer is 10 μm or more and 30 μm or less on each side of the base steel sheet.

2. A method of producing a steel sheet for hot press forming according to claim 1, the method comprising:

immersing a base steel sheet in a hot-dip coating bath for 1 s or more, wherein the hot-dip coating bath comprises a chemical composition containing Si: 7 mass % to 11 mass %, Mg: 0.6 mass % to 1.9 mass %, one or both of Ca and Sr: in total, 1.0% to 10% of Mg in atomic concentration, and Fe: 0 mass % to 5 mass %, with the balance being Al and inevitable impurity; and cooling to the solidification point of the hot-dip coating bath at an average cooling rate of 20° C./s or less.

3. A steel sheet for hot press forming, comprising a base steel sheet and a coated layer on both sides of the base steel sheet, wherein the coated layer comprises a chemical composition containing Si: 7 mass % to 11 mass %, Mg: 0.6 mass % to 1.9 mass %, one or both of Ca and Sr: in total, 1.0% to 10% of Mg in atomic concentration, Fe: 0 mass % to 30 mass %, and at least one selected from the group consisting of Mn, V, Cr, Mo, Ti, Ni, Co, Sb, Zr, and B, in total, more than 0 mass % and 2 mass % or less, with the balance being Al and inevitable impurity, wherein concentration of Mg solute in Al phase in the coated layer is less than 1 mass %, and average thickness of the coated layer is 10 μm or more and 30 μm or less on each side of the base steel sheet.

4. A method of producing a steel sheet for hot press forming according to claim 3, the method comprising:

immersing a base steel sheet in a hot-dip coating bath for 1 s or more, wherein the hot-dip coating bath comprises a chemical composition containing Si: 7 mass % to 11 mass %, Mg: 0.6 mass % to 1.9 mass %, one or both of Ca and Sr: in total, 1.0% to 10% of Mg in atomic concentration, Fe: 0 mass % to 5 mass %, and at least one selected from the group consisting of Mn, V, Cr, Mo, Ti, Ni, Co, Sb, Zr, and B, in total, more than 0 mass % and 2 mass % or less, with the balance being Al and inevitable impurity; and cooling to the solidification point of the hot-dip coating bath at an average cooling rate of 20° C./s or less.

5. A method of producing a hot pressed member, the method comprising:

heating a steel sheet for hot press forming; and hot press forming the steel sheet for hot press forming heated in the heating, wherein the steel sheet for hot press forming comprises a base steel sheet and a coated layer on both sides of the base steel sheet, the coated layer comprises a chemical composition containing Si: 7 mass % to 11 mass %, Mg: 0.6 mass % to 1.9 mass %, one or both of Ca and Sr: in total, 1.0% to 10% of Mg in atomic concentration, and Fe: 0 mass % to 30 mass %, with the balance being Al and inevitable impurity, wherein concentration of Mg solute in Al phase in the coated layer is less than 1 mass %, and average thickness of the coated layer is 10 μm or more and 30 μm or less on each side of the base steel sheet, and in the heating, temperature is increased from a heating start temperature of 50° C. or less to a heating temperature that is from the Ac3 transformation temperature of the base steel sheet to 1000° C.

6. The method of producing a hot pressed member according to claim 5, wherein, in the heating, the steel sheet for hot press forming after the temperature is increased is further held at the heating temperature for a holding time of 0 s to 300 s.

7. The method of producing a hot pressed member according to claim 5, wherein the chemical composition of the coated layer further contains at least one selected from the group consisting of Mn, V, Cr, Mo, Ti, Ni, Co, Sb, Zr, and B in total, more than 0 mass % and 2 mass % or less.

8. The method of producing a hot pressed member according to claim 7, wherein, in the heating, the steel sheet for hot press forming after the temperature is increased is further held at the heating temperature for a holding time of 0 s to 300 s.

* * * * *